(12) United States Patent
Sawahashi et al.

(10) Patent No.: US 8,385,246 B2
(45) Date of Patent: Feb. 26, 2013

(54) DOWNLINK MIMO TRANSMISSION CONTROL METHOD AND BASE STATION APPARATUS

(75) Inventors: Mamoru Sawahashi, Yokohama (JP);
Kenichi Higuchi, Yokohama (JP);
Yoshihisa Kishiyama, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 543 days.

(21) Appl. No.: 12/438,077

(22) PCT Filed: Aug. 17, 2007

(86) PCT No.: PCT/JP2007/066051
§ 371 (c)(1),
(2), (4) Date: Apr. 30, 2009

(87) PCT Pub. No.: WO2008/023646
PCT Pub. Date: Feb. 28, 2008

(65) Prior Publication Data
US 2010/0046445 A1    Feb. 25, 2010

(30) Foreign Application Priority Data

Aug. 22, 2006 (JP) ................. 2006-225923
Oct. 3, 2006 (JP) ................. 2006-272344

(51) Int. Cl.
*H04H 20/71* (2008.01)
(52) U.S. Cl. ........................ 370/312; 370/431
(58) Field of Classification Search .......... 370/329, 370/312, 431
See application file for complete search history.

(56) References Cited

U.S. PATENT DOCUMENTS

| 2003/0003863 A1 | 1/2003 | Thielecke et al. | |
| 2003/0026349 A1* | 2/2003 | Onggosanusi et al. | 375/267 |
| 2004/0095907 A1* | 5/2004 | Agee et al. | 370/334 |
| 2005/0249151 A1 | 11/2005 | Takano | |

FOREIGN PATENT DOCUMENTS

| JP | 2006-504335 A | 2/2006 |
| JP | 2006-081131 A | 3/2006 |
| JP | 2006-520109 A | 8/2006 |
| JP | 2008-079262 A | 4/2008 |
| JP | 2009-273186 A | 11/2009 |
| TW | 571525 B | 1/2004 |
| WO | 03058871 A1 | 7/2003 |
| WO | 2004039011 A2 | 5/2004 |
| WO | 2005032001 A1 | 4/2005 |
| WO | 2005114939 A1 | 12/2005 |

OTHER PUBLICATIONS

3GPP TR 25.814 V7.0.0 URL (Jun. 2006).*
3GPP TSG RAN WG1 LTE Ad Hoc, Jun. 20, 2006, R1-061672.*
3GPP TSG RAN meeting, Mar. 2006, R1-061095.*
International Search Report w/translation from PCT/JP2007/066051 dated Nov. 27, 2007 (4 pages).

(Continued)

*Primary Examiner* — Sai-Ming Chan
(74) *Attorney, Agent, or Firm* — Osha Liang LLP

(57) ABSTRACT

A method of controlling downlink transmission from a base station having multiple antennas to a mobile station having multiple antennas includes the steps of applying open loop-type MIMO diversity to one or more common control channels, an MBMS channel, and an L1/L2 control channel; and applying closed loop-type MIMO multiplexing and/or MIMO diversity to a shared data channel.

28 Claims, 21 Drawing Sheets

ENCODING BLOCK 1

| ALLOCATION RB INFORMATION | NUMBER-OF -STREAMS INFORMATION |
|---|---|

ENCODING BLOCK 2

| PRE- ENCODING INFORMATION | MCS INFORMATION | HARQ INFORMATION | CRC x UE ID |
|---|---|---|---|

OTHER PUBLICATIONS

Written Opinion from PCT/JP2007/066051 dated Nov. 27, 2007 (4 pages).
Patent Abstracts of Japan; Publication No. 2006-081131 dated Mar. 23, 2006; Tokyo Institute of Technology (1 page).
3GPP TR25.814, V7.0.0, Physical layer aspects for evolved Universal Terrestrial Radio Access (UTRA); Jun. 15, 2006 (19 pages).
3GPP TSG RAN WG Meeting #44bis; R1-061095; "Basic Schemes of Downlink MIMO Channel Transmissions for E-UTRA"; Athens, Greece, Mar. 27-31, 2006 (7 pages).
3GPP TSG RAN WG1 LTE Ad Hoc; R1-061672; "Coding Scheme of L1/L2 Control Channel for E-UTRA Downlink"; Cannes, France; Jun. 27-30, 2006 (19 pages).
3GPP TSG RAN WG1 Meeting #45; R1-061544; "L1/L2 Control Channel Structure for E-UTRA Downlink"; Shanghai, China; May 8-12, 2006 (17 pages).
3GPP TSG RAN WG1 Meeting #46; R1-062105; "Downlink MIMO Scheme in E-UTRA"; Tallinn, Estonia; Aug. 28-Sep. 1, 2006 (11 pages).
3GPP TSG RAN WG1 Meeting #46bis; R1-062730; "Downlink MIMO Scheme for Shared Data Channel in E-UTRA"; Seoul, Korea; Oct. 9-13, 2006 (7 pages).
Jeffrey G. Andrews, "Multiple Antenna Techniques", (Jul. 29, 2006).
Taiwanese Office Action for Application No. 096130897, mailed on Mar. 10, 2011 (7 pages).
Russian Office Action for Application No. 2009108799, mailed on Apr. 12, 2011 (9 pages).
Japanese Office Action for Application No. 2006-272344, mailed on Dec. 6, 2011 (9 pages).
Japanese Office Action for Application No. 2009-191409, mailed on Dec. 6, 2011 (6 pages).
Patent Abstracts of Japan for Japanese Publication No. 2009-273186, publication date Nov. 19, 2009 (1 page).
Patent Abstracts of Japan for Japanese Publication No. 2008-079262, publication date Apr. 3, 2008 (1 page).

* cited by examiner

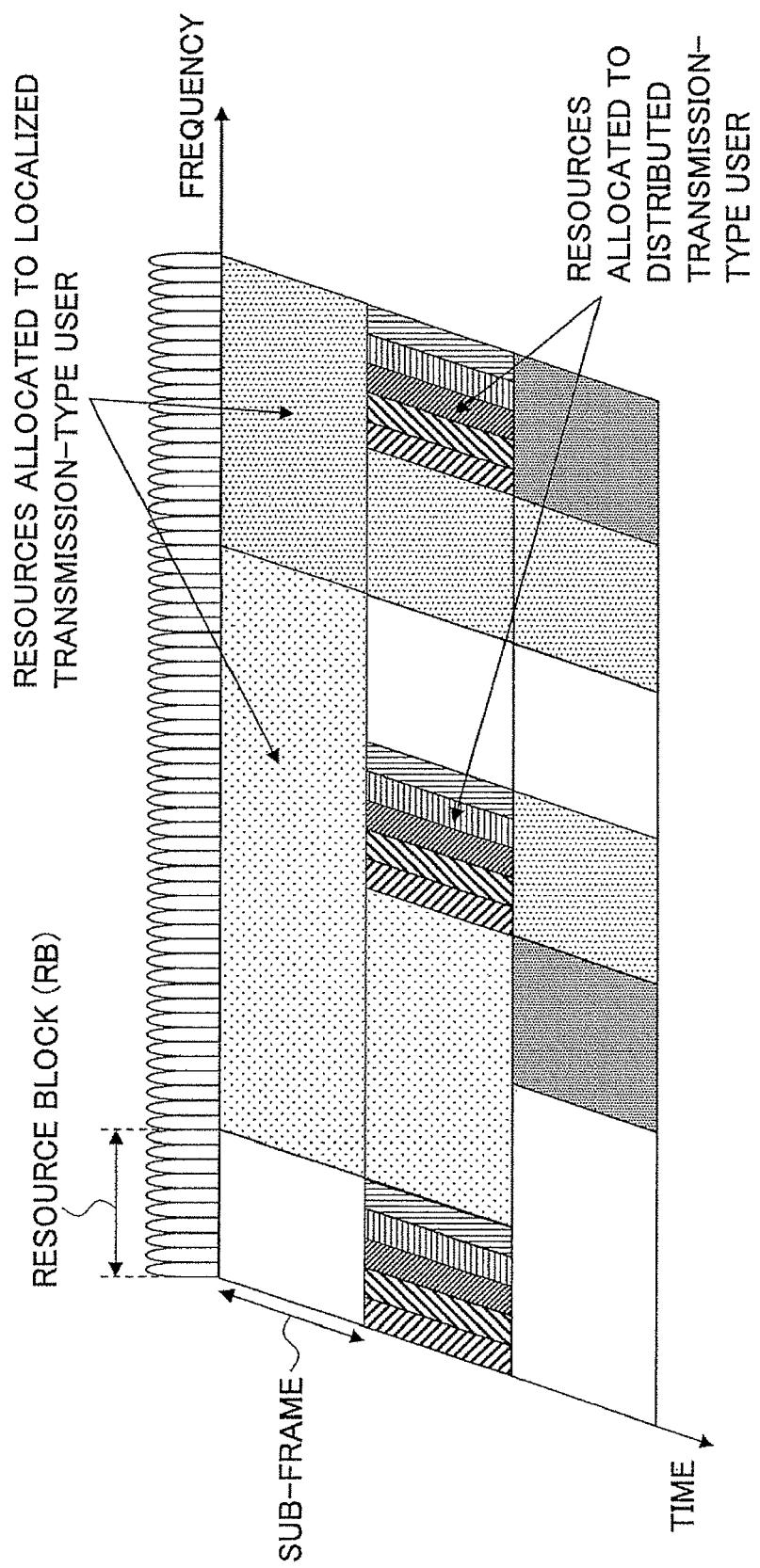

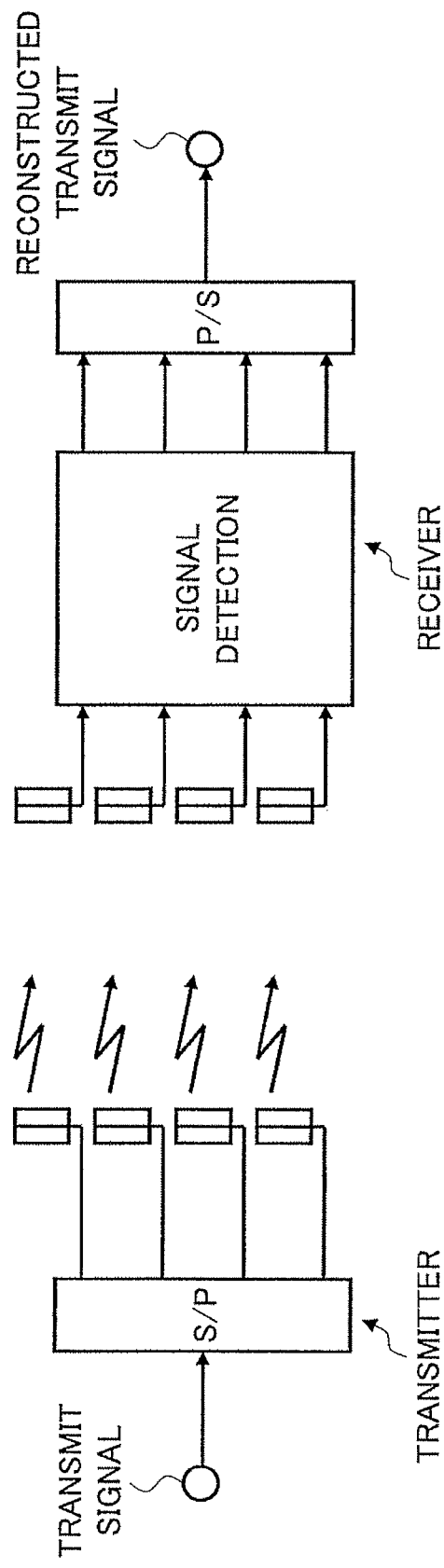

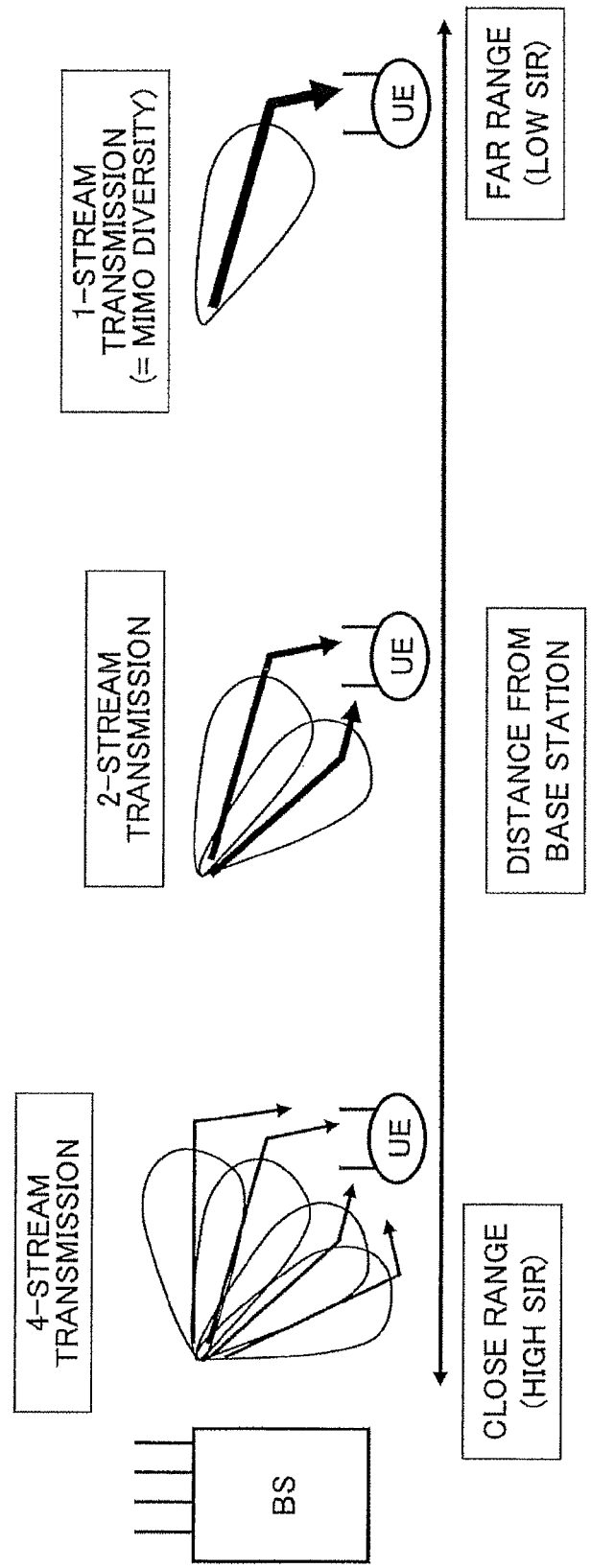

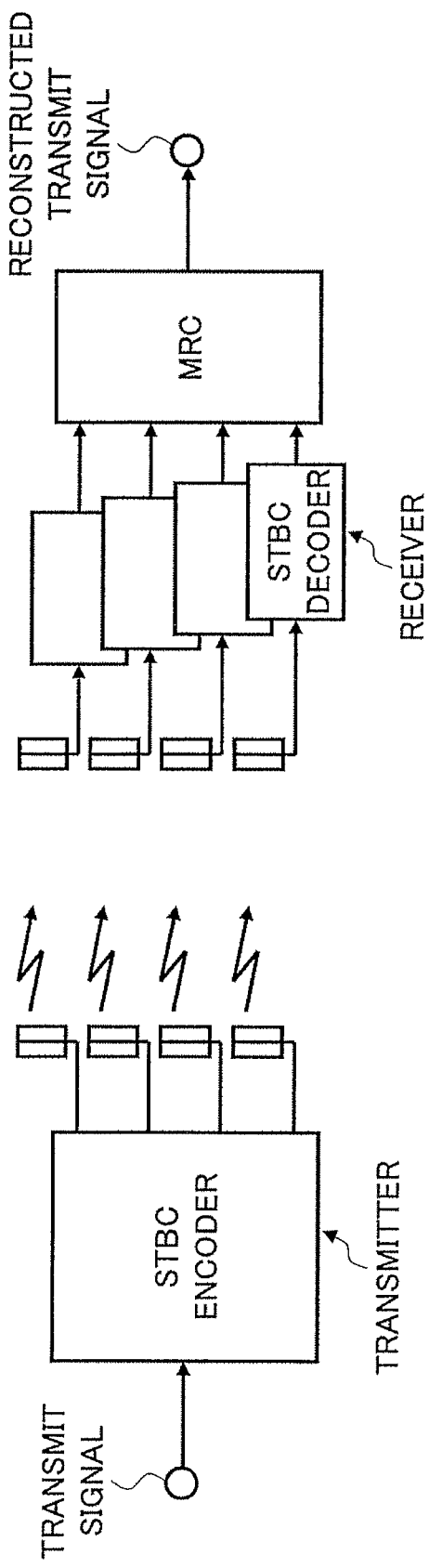

FIG.7

| SCHEME | TYPE | NEED PRIOR INFORMATION AT THE RECEIVER | COMMENTS |
|---|---|---|---|
| TIME/FREQUENCY SWITCHED TRANSMIT DIVERSITY (TSTD/FSTD) | OPEN LOOP (OL) | NO | • EASY TO EXPAND TO 2 OR MORE ANTENNAS |
| DELAY DIVERSITY (CYCLIC DELAY DIVERSITY (CDD)) | OPEN LOOP (OL) | NO | • HIGHLY COMPATIBLE WITH OFDM-BASED WIRELESS ACCESS<br>• EASY TO EXPAND TO 2 OR MORE ANTENNAS |
| BLOCK ENCODING BASED DIVERSITY (STBC/SFBC) | OPEN LOOP (OL) | YES | • MAXIMUM DIVERSITY GAIN IN OPEN LOOP |
| TRANSMIT ANTENNA SWITCHING (SELECTION) DIVERSITY (STD) | CLOSE LOOP (CL) | YES | • ABLE TO USE SINGLE RF TRANSMITTER (HIGH EFFICIENCY IN UPLINK)<br>• APPLICABLE TO SHARED/DEDICATED CHANNEL |
| PHASE DIVERSITY (TxAA) | CLOSE LOOP (CL) | YES | • HIGHLY COMPATIBLE WITH OFDM-BASED WIRELESS ACCESS<br>• CORRESPONDS TO PRE-ENCODING 1-STREAM MODE IN MIMO MULTIPLEXING<br>• APPLICABLE TO SHARED/DEDICATED CHANNEL |

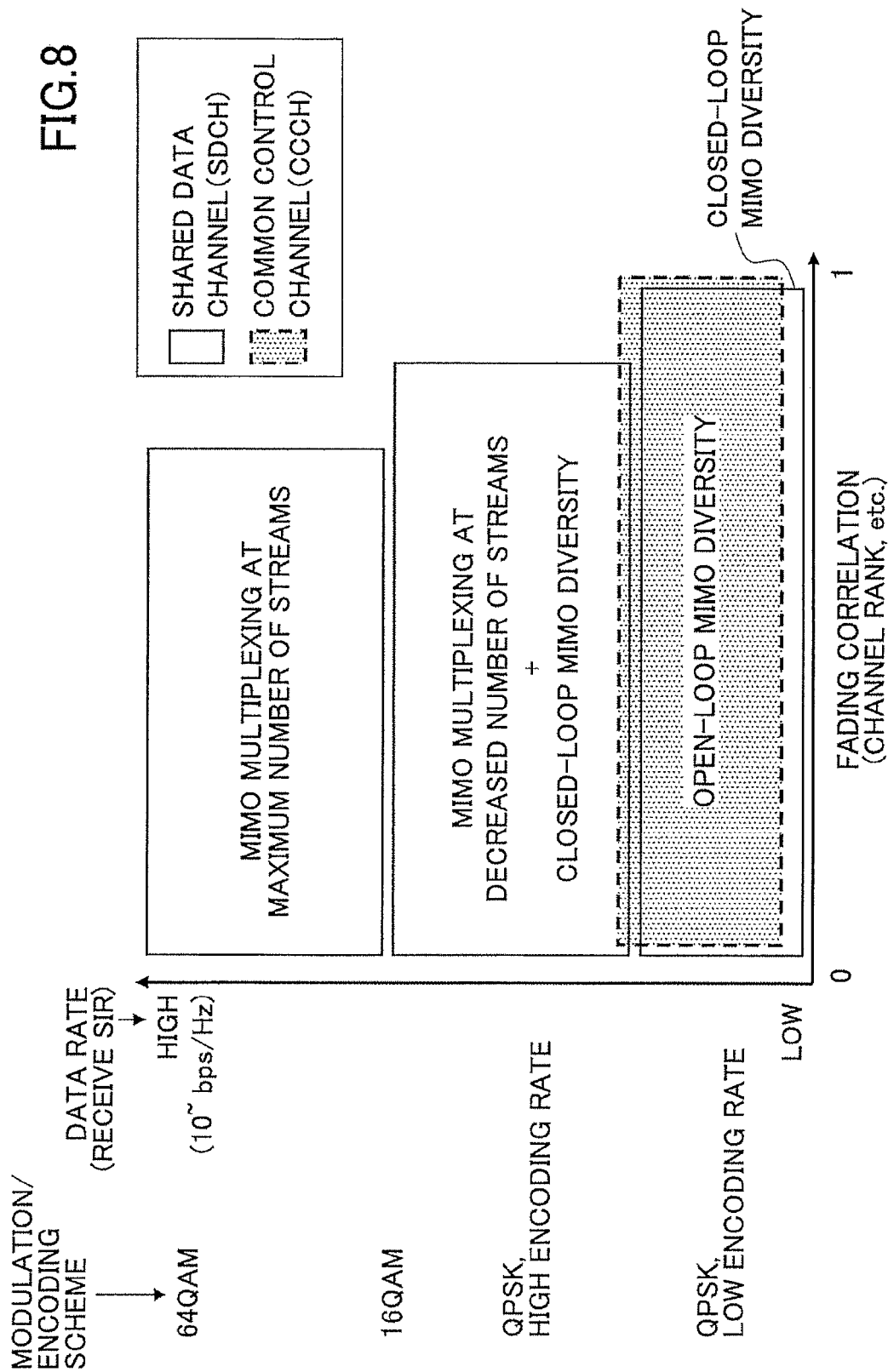

FIG.12

| CHANNEL NAME | OPEN LOOP-TYPE MIMO DIVERSITY | | REASON |
|---|---|---|---|
| SYNCHRONIZATION CHANNEL | CANDIDATE 1: PRE-ENCODING WHICH VARIES IN TIME IN A PREDETERMINED PATTERN IS MULTIPLIED FOR TRANSMITTING | | • DOES NOT REQUIRE, AT THE UE IN ADVANCE, INFORMATION ON WHETHER THE MIMO DIVERSITY IS USED<br>• TRANSMIT POWER AMPLIFIERS OF ALL BASE STATION ANTENNAS MAY BE USED (BETTER THAN TSTD)<br>• DELAY DIVERSITY (CDD) CAUSED DETERIORATION IN CELL SEARCH ACCURACY DUE TO EXCESSIVE INCREASE IN THE NUMBER OF MULTI-PATHS |
|  | CANDIDATE 2: TSTD | |  |
| BROADCAST CHANNEL | CANDIDATE 1:<br>UP TO 2 ANTENNAS: STBC OR SFBC<br>OVER 2 ANTENNAS: COMBINATION OF STBC OR SFBC, AND CDD OR TSTD/FSTD<br>CANDIDATE 2: ONLY CDD | | • STBC/SFBC HAS A BETTER CHARACTERISTIC THAN OTHER MIMO DIVERSITY WITH NO APPROPRIATE STBC/SFBC CODES, CCD COMBINATION IS USED FOR OVER 2 ANTENNAS<br>• ADVANTAGE OF USING CDD ONLY IS THAT THE SAME FRAME CONFIGURATION AS ANTENNA TRANSMISSION MAY BE USED |
| PAGING CHANNEL | THE SAME AS THE ABOVE | | • THE SAME AS THE ABOVE<br>• FOR SOFT-COMBINING AMONG SECTORS WITHIN THE SAME BASE STATION, CCD IS PREDOMINANT |
| L1/L2 CONTROL CHANNLE | THE SAME FOR ENCODING BLOCK 1, FOR ENCODING BLOCK 2, FURTHER MULTIPLYING PRE-ENCODING VECTOR FOR TRANSMISSION | | • FOR ENCODING BLOCK 2, WHEN TRANSMITTING A PRE-ENCODED PILOT CHANNEL, PRE-ENCODING VECTOR IS MULTIPLIED FOR TRANSMITTING |
| MBMS CHANNEL | DELAY DIVERSITY | | • THE MBMS PROVIDES FOR SYNCHRONOUSLY TRANSMITTING WITH OTHER CELLS TO OBTAIN DELAY DIVERSITY. SO THAT AN ALREADY-HIGH FREQUENCY DIVERSITY IS OBTAINED. THEREFORE, WITH STBC, THE EFFECT OF AN INCREASED OVERHEAD DUE TO TRANSMITTING ORTHOGONAL PILOT CHANNELS NECESSARY FOR STBC DECODING IS LARGER THAN AN IMPROVEMENT IN TRANSMIT DIVERSITY |

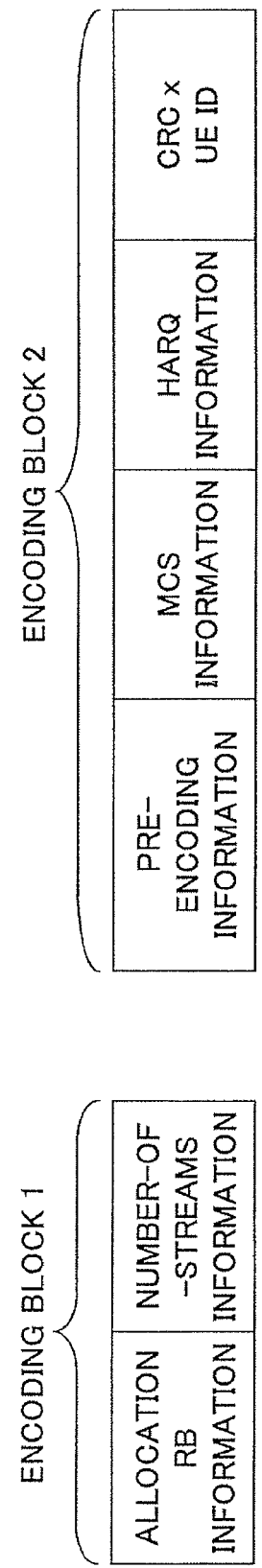

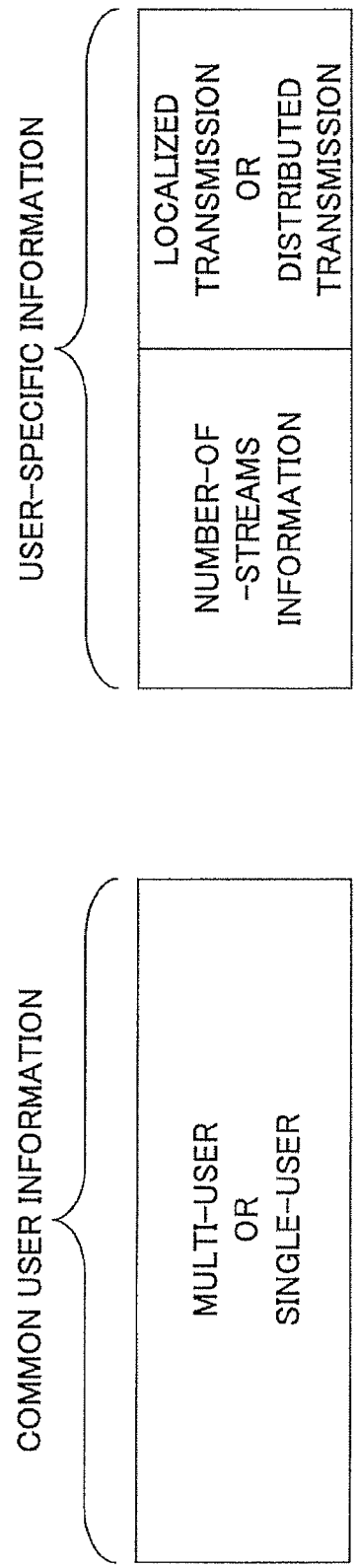

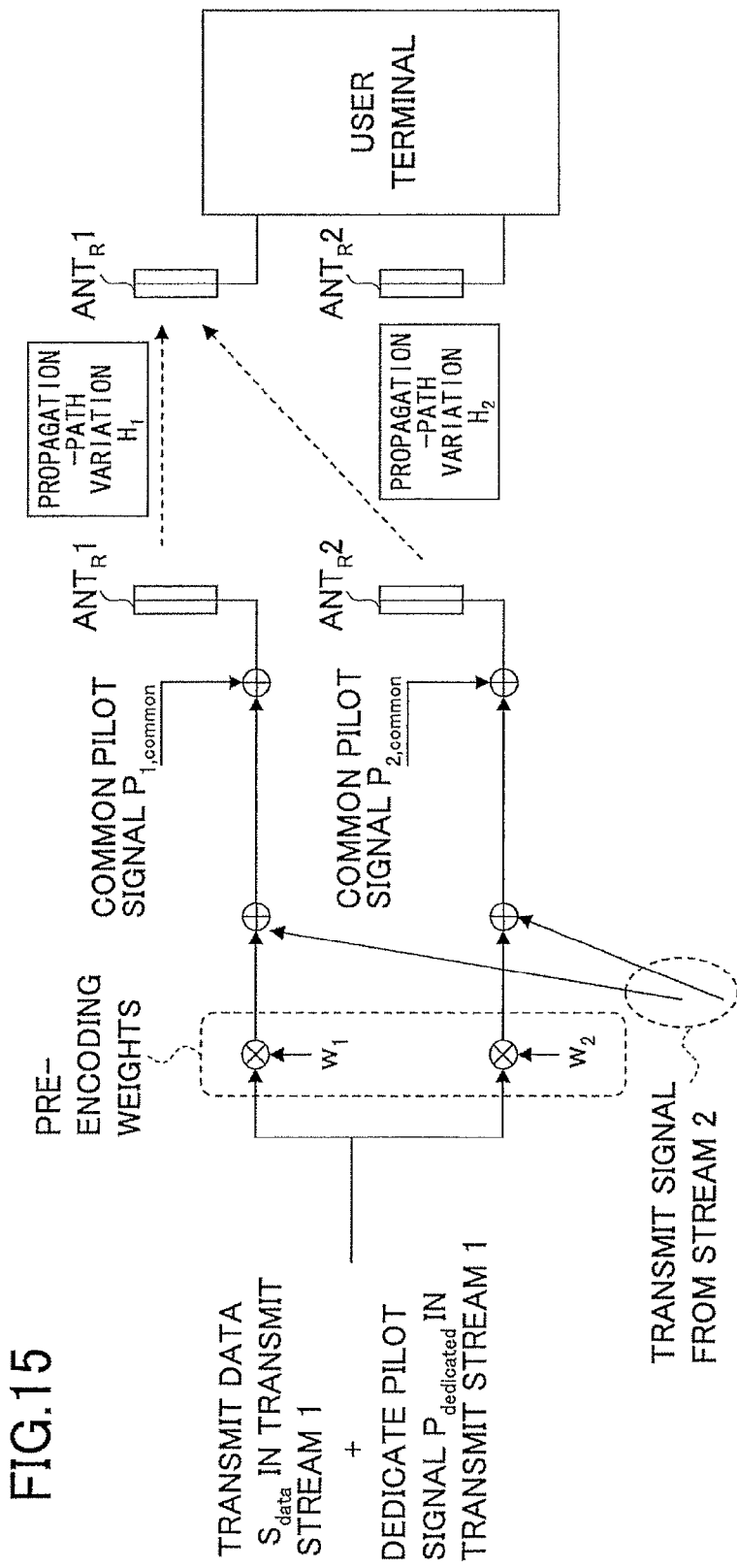

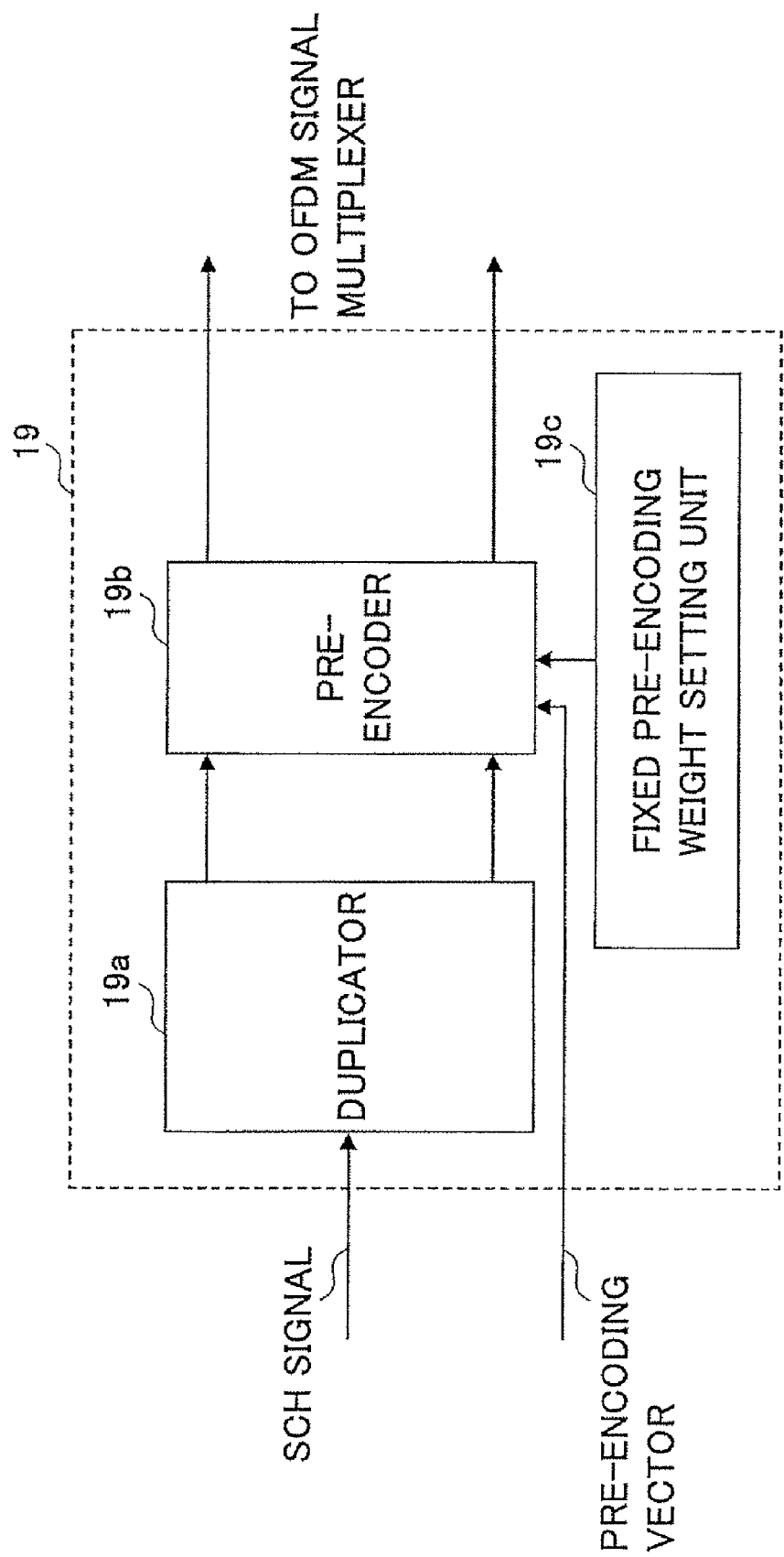

DOWNLINK MIMO TRANSMISSION CONTROL METHOD AND BASE STATION APPARATUS

BACKGROUND OF THE INVENTION

1. Field of the Invention

The present invention generally relates to the field of wireless communications and specifically relates to techniques for implementing an efficient combination of various MIMO (Multiple Input Multiple Output) transmission control techniques and transmission channels, taking into account the state of each physical channel in downlink.

2. Description of the Related Art

HSDPA (High Speed Downlink Packet Access), which has been standardized by 3GPP, provides a maximum transmission speed of 14.4 Mbps, leading to a gradual introduction of high speed and large capacity mobile communications. However, widespread use of mobile terminals including mobile phones and of the Internet, as well as an increase in variety and sophistication of the content is leading to demands for increased capacity and frequency utilization and optimized IP traffic.

LTE (Long Term Evolution), which is now being put into active use, assumes a maximum downlink transmission speed of 100 Mbps. Moreover, optimization is being demanded for both a low-speed moving terminal and a high-speed moving terminal.

With MIMO transmission, different signals are transmitted over parallel transmission paths formed by multiple inputs (transmit antennas) and multiple outputs (receive antennas) (MIMO multiplexing). This technique is considered likely to become a mandatory technique for the LTE since speed can be increased in proportion to the number of the parallel transmission paths even though the same frequency is used.

As a wireless access scheme, OFDM (orthogonal frequency division multiplexing) is suitable for high-speed transmission at the speed of over several tens of Mbps. In the OFDM, which utilizes orthogonality of frequencies, sub-carrier spectra are arranged in high density so that they overlap one another, increasing the frequency utilization. In a transmission using n sub-carriers, as a signal is divided over the multiple sub-carriers, the symbol length becomes n times relative to a system which sends a signal in one carrier.

Another technique is being proposed such that, in an MIMO-OFDM transmission scheme, which spatially multiplexes OFDM signals, phase-hopping transmit diversity is performed, which applies a different phase rotation in each sub-carrier and transmit antenna such that the transmit signals are orthogonal to one another when received, increasing the transmission rate in proportion to an increase in the number of transmit antennas due to the spatial multiplexing (e.g., see Patent document 1).

Patent Document 1:
JP2006-081131A

SUMMARY OF THE INVENTION

Problem(s) to be Solved by the Invention

As described above, various transmission techniques have been proposed for higher-speed and larger-capacity communications. However, no method has yet been proposed which takes into account basic techniques such as scheduling, and the state of physical channels to be transmitted to efficiently combine such techniques and state. A realization of such efficient combination as described above should make it possible to communicate with a smaller number of control bits at a better characteristic level, improving the communications efficiency.

The present invention aims to improve the communications efficiency of an overall system by combining optimal MIMO transmission control techniques while taking into account the state of the physical channels to be transmitted.

Means for Solving the Problem

In order to solve the problem as described above, (1) Open loop-type MIMO diversity is used for common control channels (a broadcast channel, a paging channel, a synchronization channel, etc.), an MBMS (Multimedia Broadcast Multicast Service) channel, and a Layer 1/Layer 2 (L1/L2) control channel, while closed loop-type MIMO multiplexing/MIMO diversity are used for shared data channels to be scheduled; and (2) for the shared data channels, a user is categorized as a localized-transmission type user, to which contiguous sub-carriers are allocated as one block, or as a distributed-transmission type user, to which sub-carriers are allocated in a manner distributed over a whole bandwidth, so that how to control the closed loop-type MIMO multiplexing/diversity is varied according to the user type.

More specifically, in a first aspect of the present invention, in a method of controlling downlink transmission from a base station having multiple antennas to a mobile station having multiple antennas, (a) open loop-type MIMO diversity is applied to a common control channel, an MBMS channel, and an L1/L2 control channel; and (b) closed loop-type MIMO multiplexing and/or MIMO diversity is applied to a shared data channel.

In a preferred embodiment, the MIMO multiplexing includes multiplying a pre-encoding vector with a transmit signal. For a localized-transmission type user, to which a resource block (RB) including multiple contiguous sub-carriers is allocated when transmitting a shared data channel, the number of streams in the MIMO multiplexing and a pre-encoding vector for each stream are controlled.

In this case, when transmitting the shared data channel, multi-user MIMO, which performs spatial multiplexing using multiple streams in the MIMO multiplexing, may be applied.

Moreover, the MIMO multiplexing includes multiplying a pre-encoding vector with a transmit signal. For a distributed-transmission type user, to which sub-carriers are allocated over the whole bandwidth when transmitting the shared data channel, the number of streams in the MIMO multiplexing is controlled based on the average channel state over the whole bandwidth, where the pre-encoding vector per stream is a fixed value.

In this case, the pre-encoding vector per stream makes up a set of a number of fixed-value vectors, which number corresponds to the number of antennas. The fixed-value vectors may be switched within a stream according to a predetermined pattern.

Moreover, for the distributed transmission-type user, to which the sub-carriers are allocated over the bandwidth when transmitting the shared data channel, the number of streams in the MIMO multiplexing may be controlled based on the average channel state of the whole bandwidth, with open loop-type MIMO diversity, which performs block encoding, being used together with MIMO multiplexing if the number of streams is less than the number of antennas.

In another embodiment, the L1/L2 control channel is divided into two encoding blocks to encode the divided channel, where a first of the encoding blocks includes allocated-resource block information and the number-of-streams information, and a second of the encoding blocks includes pre-encoding vectors used per stream in the MIMO multiplexing.

In this case, the mobile station, upon receiving the L1/L2 control channel, first decodes the first encoding block to extract the number of streams, and then decodes the second encoding block based on the-number-of-streams information.

Moreover, the L1/L2 control channel may be divided into two encoding blocks with the first encoding block including allocated resource block information, and the second encoding block including pre-encoding information used per stream in MIMO multiplexing.

In this case, the information includes an MIMO mode indicating whether the MIMO scheme is a single-user MIMO scheme or a multi-user MIMO scheme, the number-of-streams information, and information indicating whether the user is a localized-transmission type user to which a resource block including multiple contiguous sub-carriers is allocated, or a distributed-transmission type user to which sub-carriers are allocated over the whole bandwidth.

In this case, the mobile station, upon receiving the L1/L2 control channel, first decodes the first encoding block, and then the second encoding block based on the number-of-streams information, which information is reported using a high-layer signal.

According to a second aspect of the present invention, a base station apparatus includes:

(a) multiple antennas;

(b) a scheduler which allocates, to transmit data to multiple users, a radio resource based on the channel state fed back from a mobile station to schedule transmission;

(c) a serial/parallel converter which converts a number of streams into the transmit data based on stream information fed back from the mobile station, the number corresponding to a number up to the number of antennas; and (d) a pre-encoding processor which applies pre-encoding to each of the streams, wherein the pre-encoded transmit data is transmitted from the multiple antennas.

In a preferable embodiment, a pre-encoding processor applies a pre-encoding vector, which is fed back from the mobile station, to each stream of a transmit signal for a user to which a resource block including multiple contiguous sub-carriers is allocated by the scheduler.

In another embodiment, a pre-encoding processor, which includes a fixed pre-encoding weight setting unit, applies a predetermined pre-encoding vector to each stream of a transmit signal for a user to which are allocated by the scheduler as a resource block, sub-carriers over the whole bandwidth.

ADVANTAGE OF THE INVENTION

The present invention makes it possible to improve the downlink communications efficiency.

BRIEF DESCRIPTION OF THE DRAWINGS

FIG. 2 is a diagram illustrating exemplary resource allocations in OFDM downlink wireless access;

FIG. 3 is a diagram illustrating an example of MIMO multiplexing;

FIG. 5 is a diagram illustrating an example of MIMO multiplexing with the number of streams varied according to the receive quality;

FIG. 6 is a diagram illustrating an example of MIMO diversity using space-time block encoding (STBC);

FIG. 7 is a table listing examples of MIMO diversity in open and closed loop modes;

FIG. 8 is a diagram illustrating an adaptive MIMO channel transmission;

FIG. 12 is a diagram illustrating examples of a physical channel, to which open loop-type MIMO diversity is applied;

FIG. 13A is an exemplary configuration of a downlink L1/L2 control channel to be transmitted using the open-loop type MIMO diversity;

FIG. 14A is an exemplary configuration of a downlink L1/L2 control channel to be transmitted using the open loop-type MIMO diversity;

FIG. 15 is a diagram illustrating an exemplary method of transmitting pilot channels;

FIG. 17A is a diagram illustrating an exemplary configuration of a pre-encoding processor used in the base station apparatus in FIG. 16, and transmit diversity of a shared channel weighted in pre-encoding;

DESCRIPTION OF THE PREFERRED EMBODIMENTS

Description of Notations 10 base station apparatus; 12 scheduler; 19 pre-encoding processor; 19a duplicator; 19b pre-encoder; 19c fixed pre-coding weight setting unit; 21 other physical channel transmit signal generator; 22-1, 22-2 OFDM multiplexing/mapping unit; 28 uplink receive signal demodulator; 29-1, 29-2 antenna; 30 mobile station apparatus; 35 signal detector; 36 channel decoder; 37 downlink L1/L2 control channel demodulator; 38 channel estimator; 39-1, 39-2 antenna; 41 desired number-of-streams/stream number estimator; 42 desired pre-encoding vector estimator; 43 CQI estimator

BEST MODE OF CARRYING OUT THE INVENTION

A description is given below with regard to preferred embodiments of the present invention, with reference to the drawings. In the embodiments, optimal combinations of MIMO transmission control schemes according to the characteristic/state of physical channels to be transmitted are described in detail. The embodiments assume schemes for spatially multiplexing and transmitting OFDM signals using MIMO transmission, so that the techniques are explained first with reference to FIGS. 1 through 7.

Figure 1A:
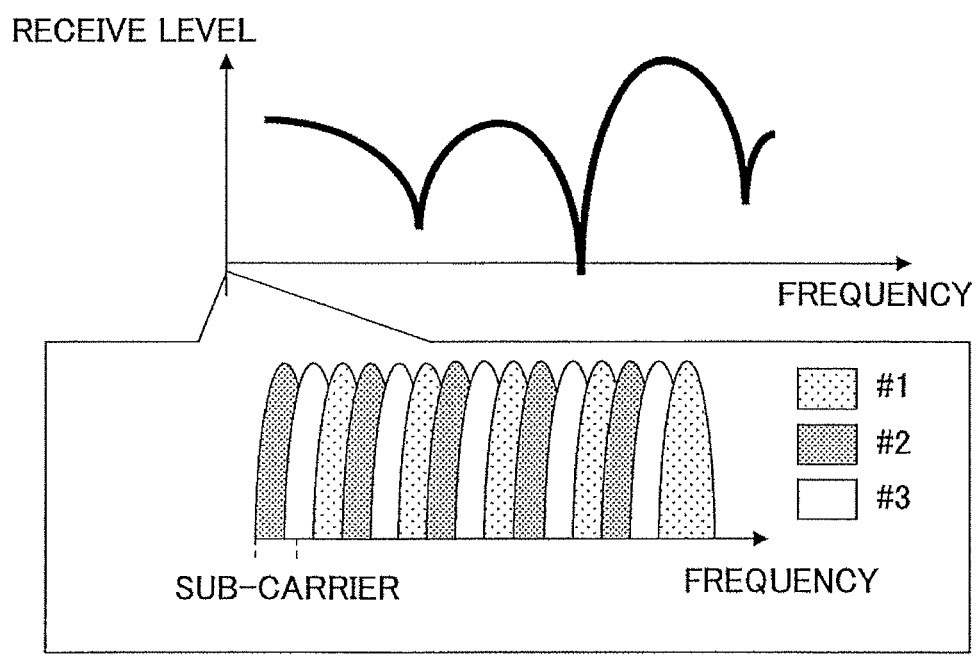
FIG. 1A is a drawing for explaining OFDM diversity according to an embodiment of the present invention.
Figure 1B:
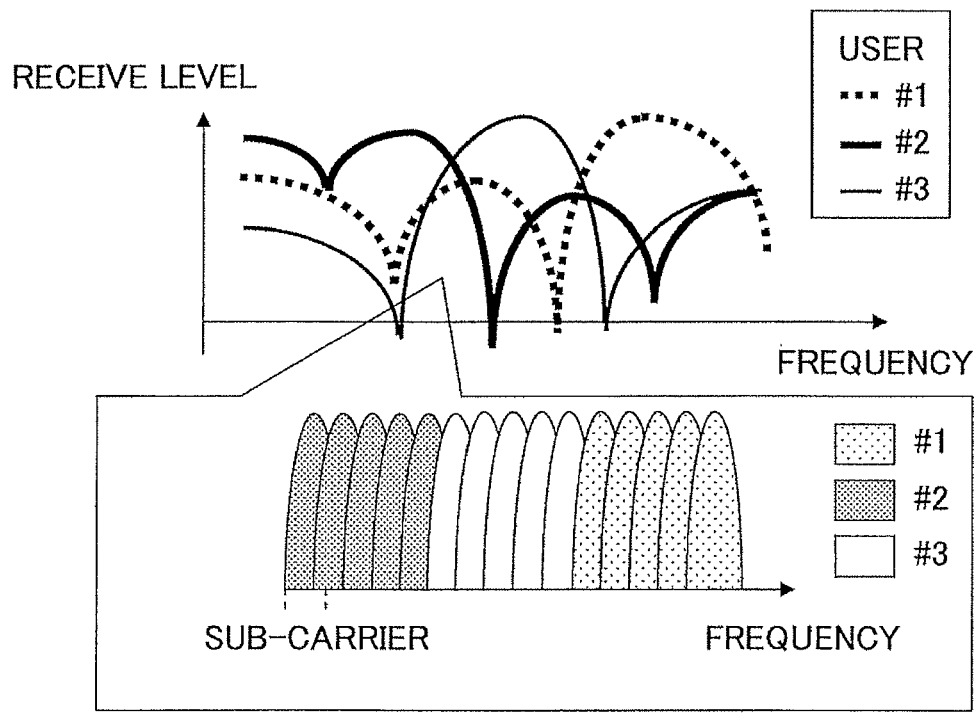
FIG. 1B is a diagram for explaining OFDM diversity according to an embodiment of the present invention.

FIGS. 1A and 1B are diagrams for explaining OFDM diversity according to the embodiments. FIG. 1A shows frequency diversity in which sub-carriers allocated to one user are spread over the whole bandwidth to obtain a diversity effect, while FIG. 1B shows multi-user diversity in which each user is allocated a resource block with a channel state which is best for the user.

The method in FIG. 1A is suitable for a user which wishes to reduce the feedback load of a channel from a mobile station (UE) to a base station, for example, a user which transmits a small amount of data such as in VoIP (voice over IP), or a user which has a difficulty following the channel state variation (fading variation). Such user as described above is called a distributed-transmission type user.

The method in FIG. 1B is such that multiple contiguous sub-carriers in a portion with the best channel state are allocated as a resource block based on feedback information from each user. A user which is allocated a resource according to such frequency scheduling as described above is called a localized-transmission type user.

FIG. 2 is a schematic drawing of an OFDM-based downlink wireless access. OFDM, in which a guard interval (GI) is inserted between effective symbol intervals, is resistant to inter-symbol interference, and multi-path interference. Moreover, OFDM, which is highly compatible with MIMO multiplexing and MIMO diversity, makes it possible to receive multicast/broadcast (MBMS) signals at high receive quality by soft combining, which utilize the delay within a guard interval range. In FIG. 2, resources are allocated to the localized and distributed transmission-type users in frequency and time directions.

FIG. 3 is a schematic drawing for explaining MIMO multiplexing. In the MIMO multiplexing, multiple different data streams are spatially multiplexed using multiple transmit antennas arranged at intervals, and multiple receive antennas arranged at intervals. Here multiple sequences of data transmitted in the same frequency and time slot are spatially multiplexed, so that data rate (frequency utilization) improves according to the number of transmit (receive) antennas. MIMO multiplexing has an advantage that the UE peak-user throughput can be improved for the downlink, especially when the channel state is good.

Figure 4:
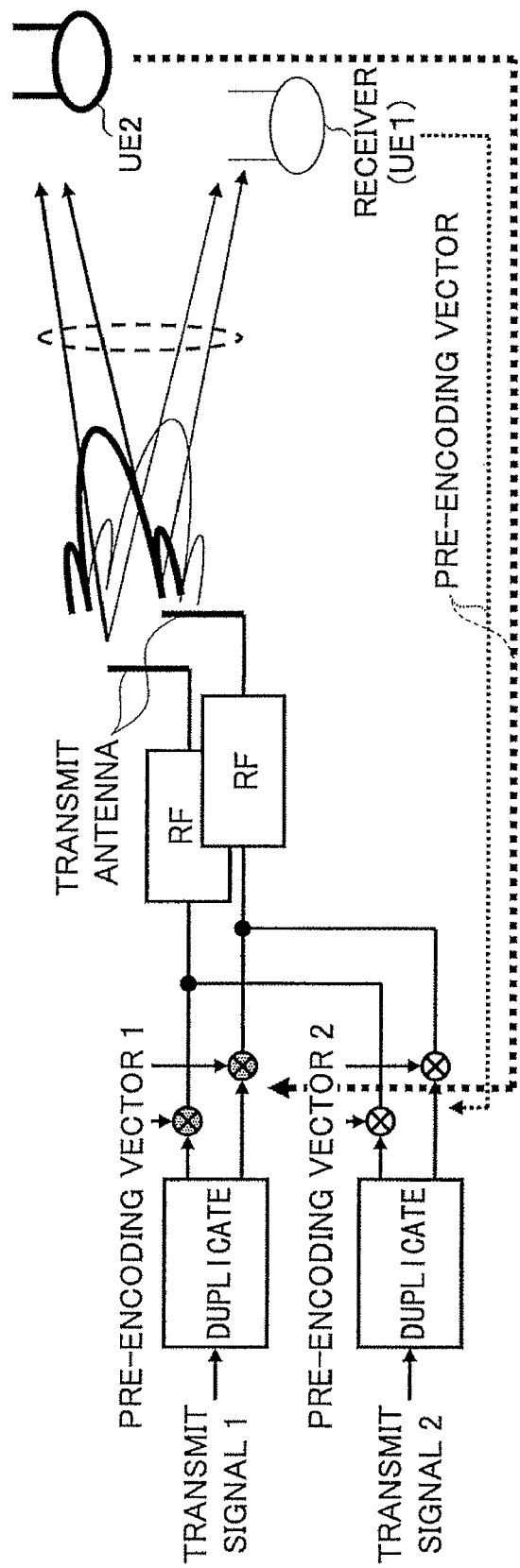
FIG. 4 is a diagram illustrating an example of MIMO multiplexing using pre-encoding vectors.

FIG. 4 is a drawing for explaining MIMO multiplexing pre-encoding according to the present embodiment. The pre-encoding makes it possible to form directional beams according to instantaneous fading variations. In other words, a beam-forming gain may be obtained. As shown in FIG. 4, data sets may be sent to multiple users using respectively different directional beams to realize multi-user MIMO, where multiple different data stream signals may be transmitted to the same user using different directional beams.

In order to perform pre-encoding, it is necessary for the pre-encoding vectors or fading variations to be rapidly fed back from a UE (mobile station). In the example in FIG. 4, feedback from the UE 1 is multiplied with each antenna transmit signal of the UE 1 using the pre-encoding vector 1 for transmit signal 1 destined for the UE 1. Similarly, feedback from the UE 2 is multiplied with each antenna transmit signal of the UE 2 using the pre-encoding vector 2 for transmit signal 2 destined for the UE 2. Such method as described above makes it possible to transmit directional beams according to fading variations, which change every moment.

FIG. 5 is a drawing for explaining MIMO multiplexing rank adaptation (mode selection) according to the present embodiment. When a large number of streams are transmitted to a UE in a poor channel state, a packet error occurs. Then, using the rank adaptation, the number of streams is controlled according to the channel state, including receive signal power to interference signal power (SIR) and fading correlation. When the number of streams becomes 1, representing that one stream is transmitted from multiple antennas, this mode becomes the same as MIMO transmit diversity.

In the example in FIG. 5, 4-stream transmission is conducted for the UE arranged in the vicinity of the base station as the SIR is good. For the UE arranged near the middle of a cell, a 2-stream transmission is conducted. For the UE arranged at the end of the cell, the SIR deteriorates, so that 1-stream transmission is conducted.

FIG. 6 is a drawing for explaining MIMO diversity according to the present embodiment. In the MIMO diversity, information bits are channel encoded and data modulated, after which space time block encoding (STBC) is performed, generating and transmitting a number of encoded data sequences, which number corresponds to the number of antennas. In other words, the same transmit signal is encoded with different codes. At the receiver, after STBC decoding is performed at each antenna, antenna diversity reception is performed using maximal ratio combining (MRC).

In the example in FIG. 6, information bits are STBC encoded into four transmit sequences, which are simultaneously transmitted to improve the diversity gain. Advantageously, the MIMO diversity makes it possible to improve the quality of transmitting to the UE when the channel state is poor and the data rate is low.

The MIMO diversity includes open-loop (OL) transmit diversity, which does not require feedback information from the UE, and closed-loop (CL) transmit diversity, which requires feedback information from the UE. In order to make channel estimation possible, orthogonal pilot channels are transmitted from all transmit antennas.

FIG. 7 is a table showing open-loop and closed-loop MIMO diversity. As examples for the open-loop diversity, time-switched transmit diversity (TSTD) or frequency switched transmit diversity (FSTD), delay diversity (CDD), and block encoding diversity (STBC/SFBC) may be used.

TSTD is a scheme such that a base station periodically switches transmit antennas per radio slot, so that, at the same moment, transmission is conducted from only one of the antennas. In the UE, the diversity effect is obtained by alternately receiving signals which passed through different propagation paths from the two antennas. It is easy to expand this scheme to 2 or more antennas.

Delay diversity is provided with the same effect as multi-path diversity by differentially transmitting between two antennas. The delay diversity is highly compatible with OFDM, in which a GI is inserted between symbols, allowing delayed transmission within the GI range. Moreover, the delay diversity is easy to expand to two or more antennas.

In block encoding diversity, block encoding such as space time block encoding (STBC) or space frequency block encoding is performed on multiple transmit sequences to improve the diversity gain.

Examples of a closed-loop (feedback-loop) mode diversity include transmit antenna switching diversity and phase diversity (TxAA).

In order to achieve optimization and increased efficiency of a system that is aimed at by the present embodiment, it is important to select a MIMO diversity scheme which is appropriate in accordance with the characteristics and state of the physical channel. Therefore, in the present embodiment, the MIMO control scheme to be adaptively selected is varied according to a physical channel to be transmitted, QoS (data rate, packet error rate, delay, etc.), and channel state per user (receive SIR, fading correlation, etc.)

FIG. 8 is a diagram showing an example of adaptive-type MIMO channel transmission according to the present embodiment. Fading correlation representing the channel state is shown on the horizontal axis, while the data rate representing QoS and the modulation/encoding scheme are shown on the vertical axis. The solid line shows control for the shared data channel, for which the closed-loop control is suitable, while the dotted line shows control for the common control channels, for which the open-loop control is suitable.

The open-loop MIMO control is suitable for transmitting the common control channels (BCH, PCH, SCH, etc.), an MBMS channel, and an L1/L2 control channel, for which the receive quality requirement is not so stringent and the rate and encoding rate of transmitting are low.

For the shared data channel, when SIR is good and the transmission is conducted at the maximum data rate, MIMO multiplexing with the maximized number of streams is applied. With a medium-level SIR, MIMO multiplexing with a reduced number of streams is combined with the closed-loop MIMO diversity (for example, transmit-antenna switching diversity). For a low SIR (for example, for transmitting to a UE located at a cell edge), the closed-loop MIMO diversity is performed. As described above, this is equivalent to MIMO multiplexing using 1-stream pre-encoding.

The closed-loop MIMO control is suitable for transmitting a shared-data channel to be scheduled. Proper use of the below-described closed-loop MIMO control schemes may be made according to the localized-transmission type user and the distributed-transmission type user with respect to the closed-loop control for the shared data channel.

In other words, for the localized-transmission type user based on frequency scheduling, the number of streams in MIMO multiplexing (see FIG. 5), and transmit weight or pre-encoding vector per stream (see FIG. 4) are controlled based on the channel state per contiguous frequency resource block allocated. For the number of streams of 1, the transmit-weight control type closed-loop MIMO diversity is used.

For the distributed transmission-type user, for which transmission is conducted over the whole bandwidth, the number of streams in MIMO multiplexing is controlled based on the average channel state of the overall bandwidth. For applying pre-encoding, the transmit weight (pre-encoding vector) per stream is a fixed value. For example, diversity effect is obtained by switching the transmit weights in a predetermined pattern in the stream. For the number of streams of 1, the switching-type open-loop MIMO diversity is used in a fixed antenna (transmit weight) pattern. When pre-encoding is not used, if the number of streams is less than the number of antennas, the open loop-type MIMO diversity for block encoding is also used.

Moreover, multi-user MIMO, in which multiple user transmit signals are spatially multiplexed using multiple MIMO-multiplexed streams, is applied only to the localized-transmission type user based on frequency scheduling with pre-encoding. In other words, for transmitting the shared data channel, multi-user MIMO may be applied to the localized-transmission type user, in which multiple streams in MIMO multiplexing are used to spatially multiplex multiple user transmit signals.

Such MIMO multiplexing schemes according to the users as described above are described in further detail with reference to FIGS. 9 through 11.

Figure 9:
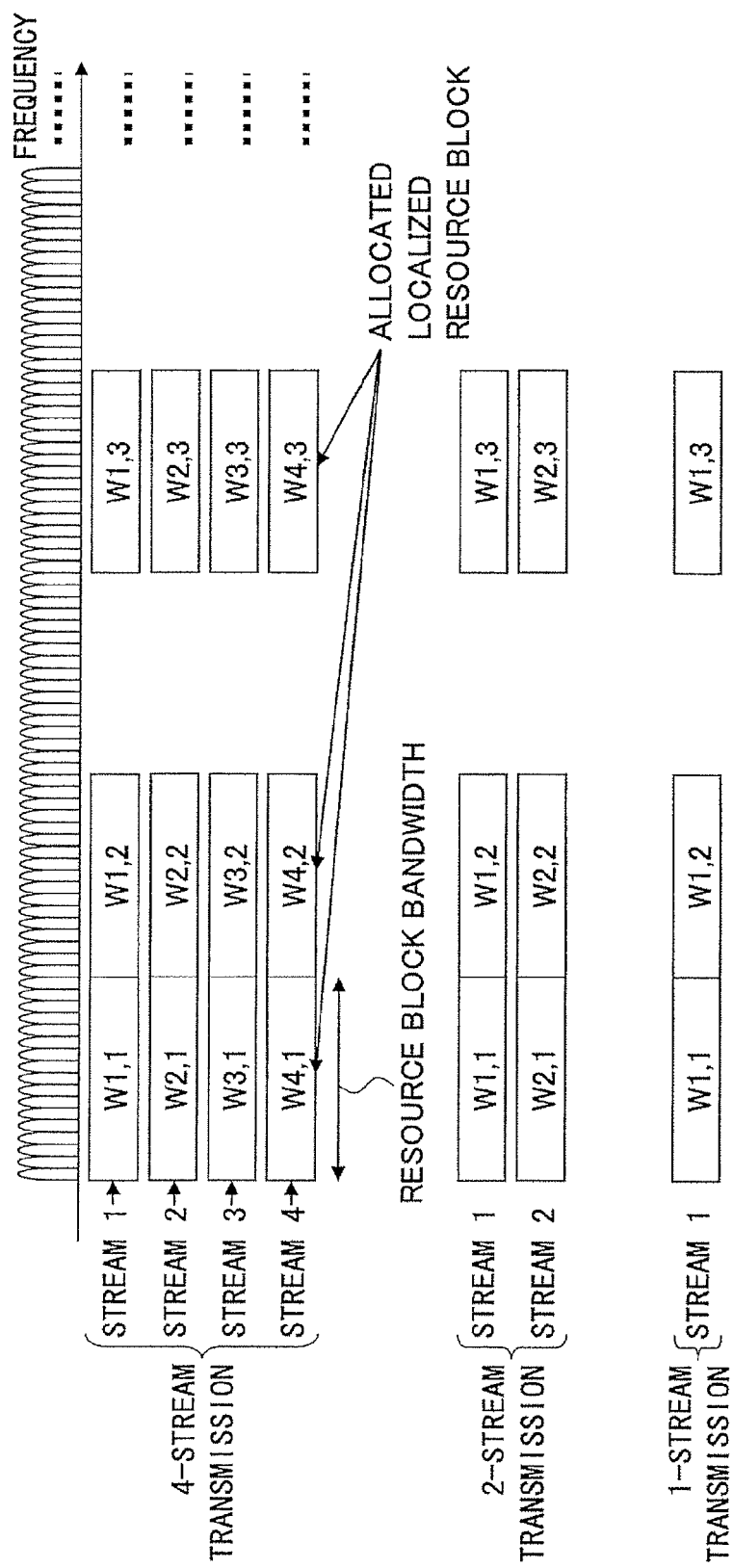
FIG. 9 is Example 1 of MIMO control for a shared data channel to be transmitted to a localized-transmission type user.

FIG. 9 is a drawing illustrating MIMO multiplexing schemes for shared data channels to be transmitted to the localized-transmission type user. In FIG. 9, pre-encoding vectors determined per resource block based on feedback information from the UE are used.

In this case, feedback information from the UE to the base station includes SINR per stream at each resource block, stream number used, and pre-encoding vector number per stream.

Here, $W_{x,y}$, in which each vector is a pre-encoding vector of a y-th resource block of an x-th stream that is determined based on feedback information, is a set of vectors $W_{x,y,n}$ for an n-th transmit antenna of a number of transmit antennas, where the number of the transmit antennas is 4. In other words, $Wx,y=\{W_{x,y,1}, W_{x,y,2}, W_{x,y,3}, W_{x,y,4}\}$.

When the UE is located near a base station, the pre-encoding vectors are determined per resource block using a 4-stream transmission. When the UE is not located near the base station, the pre-encoding vectors are determined per resource block using a 2-stream transmission. When the UE is located at the cell edge, weight-control type closed-loop MIMO diversity is used with a 1-stream transmission.

In the example in FIG. 9, while different pre-coding vectors are determined per resource block, the number of bits for the control channel may be reduced by setting a restriction such that the pre-encoding vectors must be the same for multiple neighboring resource blocks. In this case, feedback information from the UE to the base station includes SINR per stream at a sub band, which sub band is a group of multiple neighboring resource blocks, stream number used, and pre-encoding vector number for each stream.

Figure 10:
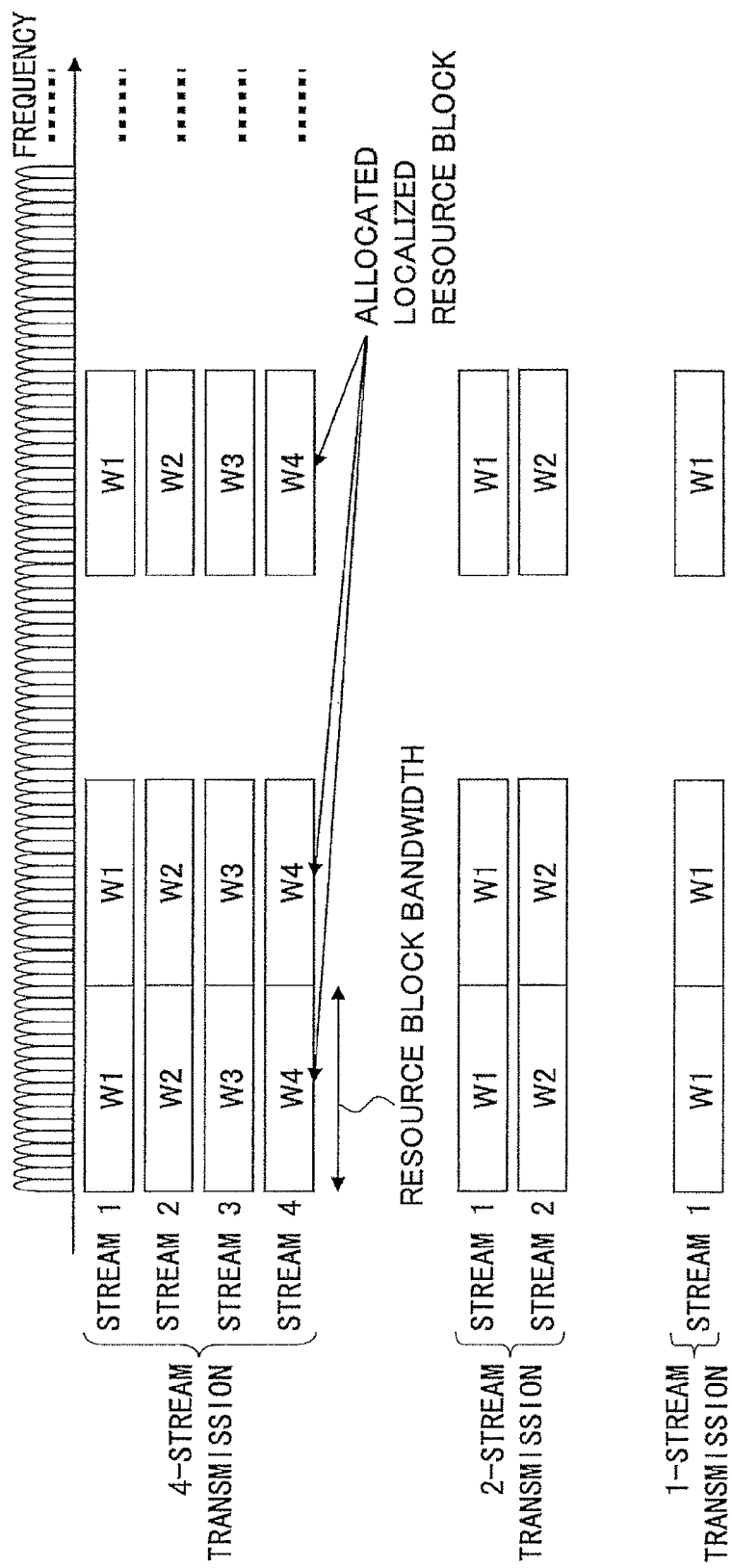
FIG. 10 is Example 2 of the MIMO control for the shared data channel to be transmitted to the localized-transmission type user.

FIG. 10 also shows a MIMO control scheme at the time of transmitting a shared data channel to the localized-transmission type user. However, the scheme in FIG. 10 is different from the scheme in FIG. 9 in that it uses the same pre-encoding vector for all resource blocks within a stream. The relationship between the stream number and the pre-coding vector may be predetermined on a one-on-one basis. In this case, feedback information from the UE to the base station may be only the stream number used.

In the method in FIG. 10, while the control accuracy according to the channel variation of the pre-encoding vector is inferior, the number of uplink feedback bits and the number of downlink control channel bits may be reduced.

Figure 11:
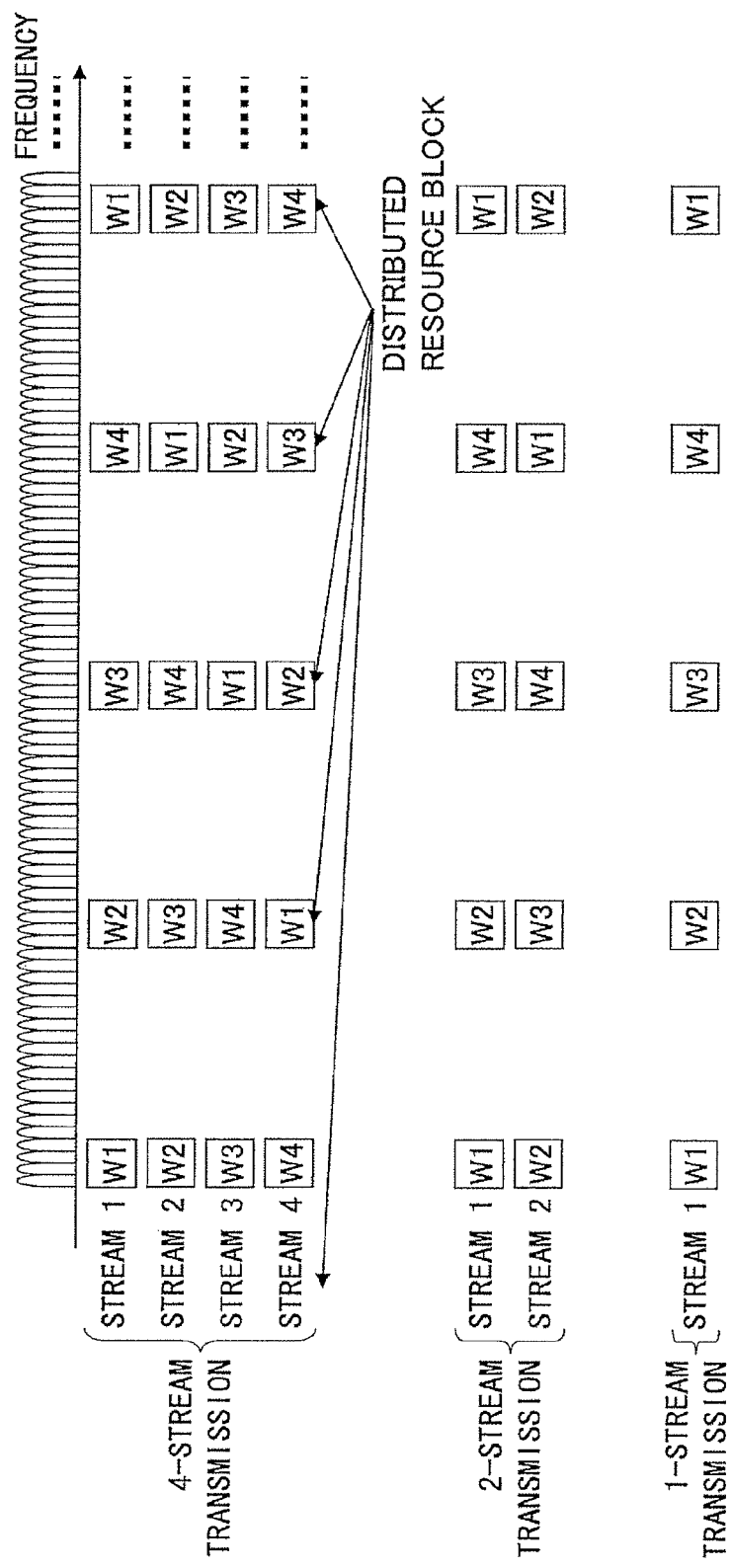
FIG. 11 is an example of MIMO control for a shared data channel to be transmitted to a distributed-transmission type user.

FIG. 11 is a drawing illustrating MIMO multiplexing schemes for shared data channels to be transmitted to the distributed-transmission type user. Here, transmit weight (pre-encoding vector) per stream is a fixed value. In the example in FIG. 11, the transmit weights are switched in a predetermined pattern in a stream. The above-mentioned pattern is also known in advance by the UE.

Information to be fed back from the UE to the base station is an average SINR per stream for the overall bandwidth, and the stream number used. The transmit period may differ from one control bit to another. In general, information of the stream number used (including the number of streams) may be fed back at a rate lower than that for the SINR.

Here, Wx is a set of pre-encoding vectors $W_{x,n}$ for an n-th transmit antenna of a number of transmit antennas, where the number of base station antennas is 4. In other words, $Wx=\{W_{x,1}, W_{x,2}, W_{x,3}, W_{x,4}\}$.

For Wx, different value may be used for each packet in a predetermined pattern.

FIG. 12 shows an example of an application to physical channels for the open-loop type MIMO diversity according to the present embodiment. While not shown in the table in FIG. 7, an open-loop MIMO diversity scheme, such that pre-encoding which varies in time in a predetermined pattern is multiplied for transmitting, is applied as Candidate 1. One reason for applying the above scheme is that it does not require, at the UE in advance, information on whether the MIMO diversity is used. Moreover, transmit power amplifiers of all base station antennas may be used, so that the scheme is more suitable than time-switched type transmit diversity (TSTD). Moreover, TSTD is applied as Candidate 2.

For the broadcast channel (BCH), as Candidate 1, block encoding diversity (STBC or SFBC) is used for up to 2 antennas, and a combination of block encoding diversity and delay diversity (CDD) or time (frequency) switched transmit diversity is used for over 2 antennas. This is because the STBC/SFBC has a better characteristic than other open loop-type MIMO diversity schemes. For over 2 antennas, there are no appropriate STBC/SFBC codes, so that delay diversity schemes are combined. As Candidate 2, only the delay diversity is used. An advantage of applying only the delay diversity is that the same frame configuration as antenna transmission may be used.

For the paging channel (PCH) and L1/L2 control channel, the same open loop MIMO diversity as the broadcast channel may be used. For soft-combining among cells (sectors) within the same base station, applying only the delay diversity is predominant.

For the L1/L2 control channel, the same open loop MIMO diversity as the broadcast channel may be used for an encoding block 1 as described below. In other words, for a base station having multiple antennas, the same transmit scheme as for BCH and PCH may be used for transmitting the encoding block 1 (allocated RB information (and the number-of-streams information)). Moreover, for the below-described encoding block 2 (pre-encoding information, MCS information, ARQ information, UE ID or CRC), the same open-loop MIMO diversity as the broadcast channel may be used. In addition, a MIMO diversity scheme such that a pre-encoding vector is multiplied for transmitting may also be used. For encoding block 2, when transmitting a pre-encoded pilot channel, a pre-encoding vector is multiplied for transmitting.

For transmitting the MBMS channel using the open-loop MIMO diversity, the delay diversity (including cyclic delay diversity (CDD)) is applied. The MBMS provides for synchronously transmitting with other cells to obtain delay diversity, so that an already-high frequency diversity is obtained. Therefore, with STBC, the effect of an increased overhead due to transmitting orthogonal pilot channels necessary for STBC decoding is greater than an improvement in transmit diversity. Here, the use of the delay diversity makes it possible to reduce the overhead for the pilot for demodulating relative to the use of other methods.

FIG. 13A shows a channel configuration for a downlink L1/L2 control channel that is suitable for the open-loop control. The L1/L2 control channel is transmitted from the base station to the UE in association with the shared data channel. The L1/L2 control channel contains the following information items:

(1) information on allocated resource-block;

(2) information on the number-of-streams;

(3) information on pre-encoding vectors used per stream for the number of streams (As shown FIG. 11, when the relationship is predetermined on a one-on-one basis between the stream number and the pre-encoding vector, only the stream number used may be reported.);

(4) MCS (modulation scheme and encoding rate) per stream (In principle, sending is performed for the number of streams, but when using a modulation scheme and encoding rate which are common among the streams, sending is performed only once.);

(5) Information related to hybrid ARQ (In principle, sending is performed for the number of streams, but when transmitting the same encoding block signal for the multiple streams, sending is performed only once.); and (6) UE ID information.

Of the information items as described above, information items (1) and (2) are collectively encoded (encoding block 1). On the other hand, a CRC bit is added to information items (3) and (5) as a collection of information. The CRC bit is convolved with the IE ID information (6) to transmit the convolved result (encoding block 2). CRC is computed for the control bits of all the encoding blocks 1 and 2.

Figure 13B:
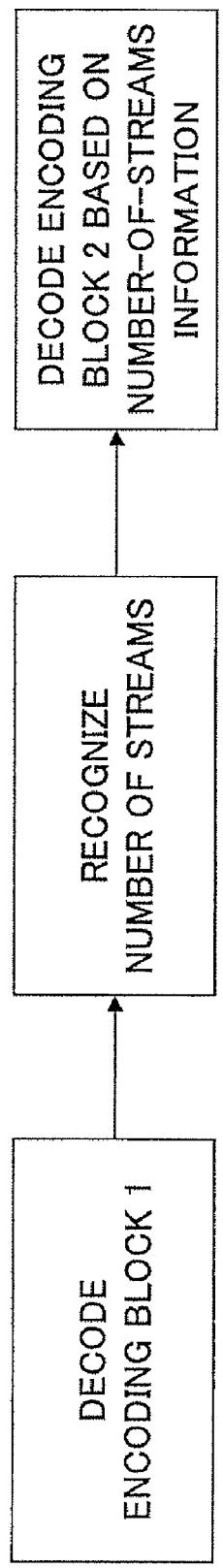
FIG. 13B is an exemplary decoding of the downlink L1/L2 control channel to be transmitted using the open-loop type MIMO diversity.

FIGS. 13A and 13B show the channel configuration and decoding method for such downlink L1/L2 control channel as described above. As shown in FIG. 13A, L1/L2 control channel is divided into two encoding blocks 1 and 2 to encode the divided blocks. The encoding block 1 includes the allocated resource block information and the number-of-streams information ((1)+(2)). The encoding block 2 includes pre-encoding information, MCS information, hybrid ARQ (HARQ) information, and a convolution of the CRC bit and the UE ID ((3)+(4)+(5)+(6)×CRC)) The encoding block 2 varies in length according to the number of streams.

As shown in FIG. 13B, for decoding the L1/L2 control channel at the mobile station, the encoding block 1 is decoded to recognize the number of streams. Next, the encoding block 2 is decoded based on the information as described above. The information length of the encoding block 2 varies according to the number of streams. However, as the encoding block 1 is decoded in advance, there is no need to assume the multiple information lengths to attempt decoding the encoding block 2.

Moreover, the L1/L2 control channel may be configured as per below.

In this case, as shown in FIG. 14A, common user information (information indicating a MIMO mode such as multi-user or single-user), and user-specific information (e.g., number-of-streams-information, information indicating whether it is a localized transmission or distributed transmission) are reported in advance in a high-layer control signal. Here, localized transmission is a transmitting scheme which allocates contiguous sub-carriers as one block, while distributed transmission is a transmitting scheme which spreads sub-carriers over the whole bandwidth. The transmission of the number-of-streams information may be conducted at low speed (with transmitting at a transmitting period no less than 100 msec, or transmitting at the time of the start of communications), so that the number-of-streams information is transmitted using the high-layer signal, not the L1/L2 control channel.

Figure 14B:
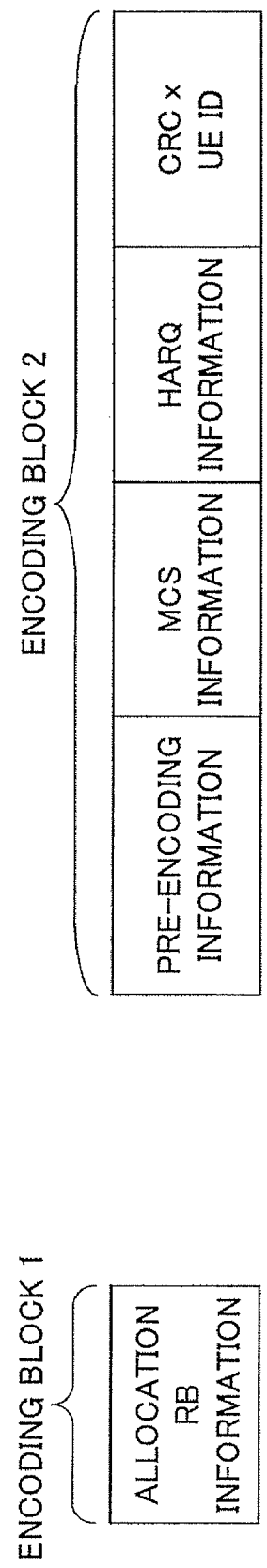
FIG. 14B is an exemplary configuration of the downlink L1/L2 control channel to be transmitted using the open loop-type MIMO diversity.

As shown in FIG. 14B, the L1/L2 control channel contains the following information:

(1) information on allocated resource-block;

(2) information on pre-encoding vectors used per stream for the number of streams (When the relationship is predetermined on a one-on-one basis between the stream number and the pre-encoding vector, only the stream number used may be reported.); and (3) MCS per stream (modulation scheme and encoding rate) (In principle, sending is performed for the number of streams, but when using a modulation scheme and encoding rate common among the streams, sending is performed only once.);

(4) Information related to hybrid ARQ (In principle, sending is performed for the number of streams, but when transmitting the same encoding block signal for the multiple streams, sending is performed only once.); and (5) UE ID information.

Of the information items as described above, the information item (1) is encoded (encoding block 1). In the meantime, the information items (2) through (5) are collectively encoded (encoding block 2), where CRC bits are collectively transmitted with the information items (2) through (4), with the CRC bits convolved with the information item (5). CRC is computed for the control bits of all the encoding blocks 1 and 2.

In other words, the L1/L2 control channel is divided into two encoding blocks 1 and 2 to encode the divided blocks. The encoding block 1 includes the allocated resource block information (1). The encoding block 2 includes pre-encoding information, MCS information, hybrid ARQ (HARQ) information, and a convolution of the CRC bit and the UE ID ((2)+(3)+(4)+(5)×CRC). The encoding block 2 varies in length according to the number of streams.

For decoding the L1/L2 control channel at the mobile station, the encoding block 1 is decoded, and, next, (2) through (5) are decoded based on such information as described above. The information lengths of (2) through (5) vary in length according to the number of streams. However, as the number-of-streams information is decoded in advance, there is no need to assume the multiple information lengths to attempt decoding the information items (2) through (5).

FIG. 15 shows a transmission method of a pilot channel to be transmitted using OFDM-MIMO according to the present embodiment. In the present embodiment, (1) a common pilot channel (pilot 1), which does not use pre-encoding transmitted from each base station antenna; and (2) a dedicated pilot channel (pilot 2), which has been pre-encoding within the allocated resource block in accordance with each stream transmitted from each base station antenna are transmitted.

The pilot 1 (common pilot), which is transmitted to all users, is used for measuring the SINR, determining the number of streams and the pre-encoding vector, and demodulating the distributed-transmission type user at the user terminal.

The pilot channel 2, which is transmitted only to the localized-transmission type user, is used for demodulating the localized-transmission type.

For transmitting the Pilot 2 (dedicated pilot channel), the pre-encoding information of the encoding block 2, out of information included in the downlink L1/L2 control channel, may be omitted. For not separately transmitting the dedicated pilot channel, the channel estimation value for each pre-encoded transmit stream is estimated from the common pilot channel based on the pre-encoding information included in the downlink L1/L2 control channel. This will be explained with reference to FIG. 15.

In FIG. 15, transmit data $S_{data}$ in a transmit stream 1 and a dedicated pilot signal $P_{dedicated}$ in the transmit stream 1 are each weighted with a pre-encoding vector $w_1$ for an antenna 1. The weighted data and signal are combined with a transmit signal from a stream 2 and a common pilot signal $P_{1,common}$, so that the combined result is transmitted from the antenna 1. This transmit signal as described above undergoes a propagation-path variation $H_1$, after which it is received at a UE receive antenna 1.

The transmit data $S_{data}$ and the dedicated pilot signal $P_{dedicated}$ in the transmit stream 1 are each weighted with a pre-encoding vector $w_2$ for an antenna 2. The weighted data and signal are combined with a transmit signal from the stream 2 and a common pilot signal $P_{2,common}$, so that the combined result is transmitted from the antenna 2. This transmit signal as described above undergoes a propagation-path variation $H_2$, after which it is received at a UE receive antenna 1. The common pilots $P_{1,common}$ and $P_{2,common}$ are orthogonal to each other.

A received signal $R_{data}$ for the transmit data $S_{data}$ in the transmit stream 1 is $$R_{data}=(w_1 H_1+w_2 H_2)S_{data} \quad (1),$$

while a received signal $R_{pd}$ for the dedicated pilot $P_{dedicated}$ in the transmit stream 1 is $$R_{pd}=(w_1 H_1+w_2 H_2)P_{dedicated} \quad (2).$$

The dedicated pilot channel $P_{dedicated}$ is known in advance at the mobile station, so that $(w_1 H_1+w_2 H_2)$ is determined from the receive signal $R_{pd}$ and the dedicated pilot channel $P_{dedicated}$. Then, the transmit data $S_{data}$ may be estimated using equation (1) without sending the pre-encoding information using the L1/L2 channel.

In the meantime, the receive signal $R_{p1}$ for the common pilot channel $P_{1,common}$ is such that $R_{p1}=(H_1)P_{1,common}$ and the receive signal $R_{p2}$ for the common pilot channel $P_{2,common}$ is such that $R_{p2}=(H_2)P_{2,common}$. Then, when the dedicated pilot channel is not sent and only the common pilot signal is sent, the receive data $S_{data}$ is estimated from pre-encoding information $w_1$, $w_2$ and the channel estimation values $H_1$, $H_2$, which are estimated from the received common pilot channel.

Such configuration as described above makes it possible to save radio resources to be allocated to a localized-transmission type user.

Figure 16:
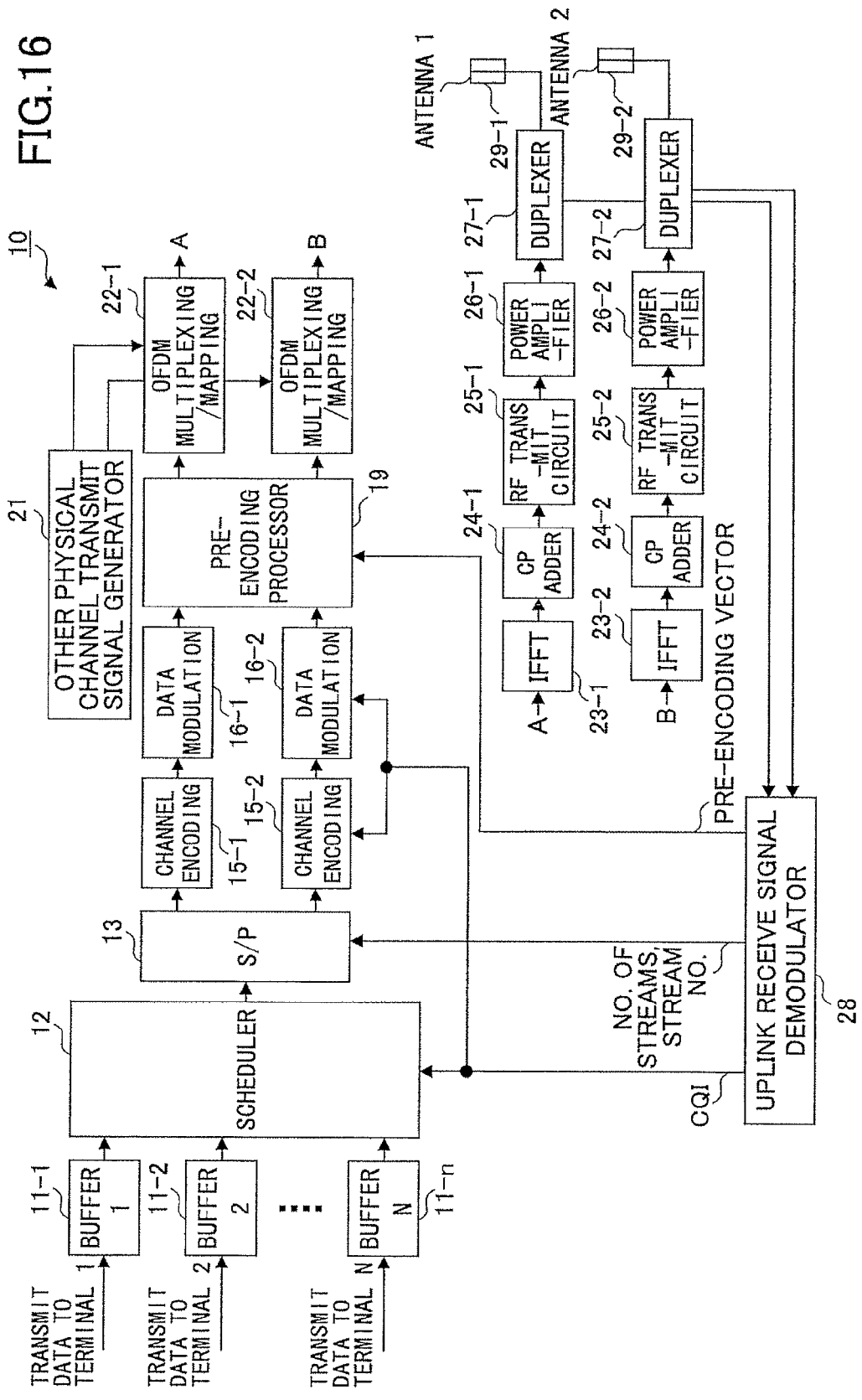
FIG. 16 is an exemplary configuration of a base station apparatus according to an embodiment of the present invention.

FIG. 16 is a schematic block diagram showing a configuration of a base station apparatus according to the present embodiment. A base station apparatus 10 has multiple antennas 29-1 and 29-2. The base station apparatus 10 includes buffers 11 set for each user, a scheduler 12 for scheduling transmission for each of the users, a serial/parallel converter (S/P) 13, channel encoders 15-1, 15-2 and data modulators (16-1, 16-2), which are set for each antenna, and a pre-encoding processor 19. Feedback information (CQI, receive SIR, etc.) from a mobile station that is demodulated at an uplink receive signal demodulator 28 is input at the scheduler 12. According to whether it is a distributed-transmission type user or a localized-transmission type user, resource allocation and transmission scheduling are performed as shown in FIG. 2, for example. Number-of-streams/the stream number are input to the S/P converters 13. The S/P converters 13 perform serial-to-parallel conversions for a number of times, the number being the number of streams. For the number of streams of 1, no serial to parallel conversion is performed.

A desired pre-encoding vector from the mobile station is input to the pre-encoding processor 19, where each transmit sequence is weighted as shown in FIG. 4. For the distributed-transmission type, the pre-encoding processor 19 performs the weighting according to a predetermined pattern. For the localized transmission type, the base station eventually determines the pre-encoding vector as desired by the terminal.

The data modulators (16-1, 16-2) control encoding rate and data modulation scheme based on CQI according to a transmission scheme which adaptively changes a modulation scheme and error-correction encoding rate (i.e., AMC (adaptive modulation and encoding)) according to a variation in the propagation environment.

The other physical channel transmit signal generator 21 generates a transmit diversity signal which varies from one physical channel state to another.

Figure 17B:
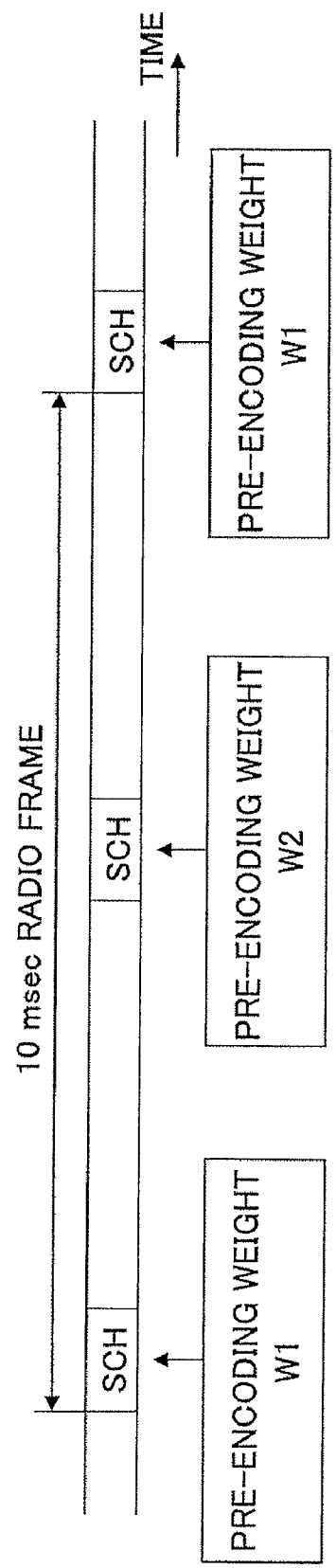
FIG. 17B is a diagram illustrating an exemplary configuration of the pre-encoding processor used in the base station apparatus in FIG. 16, and transmit diversity of the shared channel weighted in pre-encoding.

FIGS. 17A and 17B are drawings showing a configuration of a pre-encoding vector processor 19, and an application of pre-encoding weights on shared channels to be transmitted. A case is shown for using SCH as an example of a shared channel. In FIG. 17A, the pre-coding processor 19 includes a duplicator 19a, a pre-encoder 19b, and a fixed pre-encoding weight setting unit 19c. The duplicator 19a duplicates, into multiple channels (two, in this example), a shared channel which is channel encoded and data modulated. The pre-encoding unit 19b multiplies each of the duplicated channels with a pre-encoding vector.

For multiplying with a weight, for a localized-transmission type user, according to the channel state, a pre-encoding vector which is fed back from the mobile station as shown in FIG. 9 is used. In the meantime, for using a pre-encoding vector which has been set in advance per stream for a localized-transmission type user as shown in FIG. 10, a fixed pre-encoding vector corresponding to each stream is set at the fixed pre-encoding weight setting unit 19c. In this case, a table (not shown) associating a stream number with a pre-encoding vector which is predetermined per stream may be maintained.

Moreover, even for using a set of pre-encoding vectors that is predetermined per stream as shown in FIG. 11, the fixed pre-encoding weight setting unit 19c applies, to each stream, a corresponding set of vectors. In this case, a table (not shown) associating a stream number with a set of pre-encoding vectors (including a number of pre-encoding vectors, which number corresponds to the number of antennas) that is predetermined per stream may be maintained.

FIG. 17B shows transmit diversity for a pre-encoded signal sequence. As shown in FIG. 4, both of a pre-encoding vector w1-applied signal 1 and a pre-encoding vector w2-applied signal 2 are sent to each antenna. For sending these two differently-weighted transmit channels from one antenna, different sub-frames within a 10 ms radio frame are used for transmission. In this way, a transmit diversity effect is obtained.

Turning back to FIG. 16, the pre-encoded signal sequences are division-multiplexed to mutually orthogonal sub-carriers at OFDM multiplexing/mapping units 22-1, 22-2, and mapped onto the complex plane. The respective complex-modulated OFDM sub-carrier signals are inverse fast Fourier transformed at IFFT units 23, given a CP (cyclic prefix) at CP adders 24, converted to an RF signal at RF transmit circuits 25, amplified at power amplifiers 26, and transmitted from antennas 29 via duplexers 27.

In this way, shared data channels to be scheduled are MIMO multiplexed (in the closed loop) for transmission based on feedback information. For the number of streams of 1 as found in the feedback information, MIMO transmit diversity is used.

In the meantime, other physical channel (common control channel, L1/L2 control channel, MBMS channel, etc.) transmit signals are also led to a number of sequences at an other physical channel transmit signal generator 21, the number corresponding to the number of antennas, and OFDM-multiplexed and mapped. Although not specifically shown, for generating the L1/L2 control channel, the broadcast channel, and the paging channel, an STBC encoder is arranged following the channel encoder and the modulator. Moreover, as with the shared data channel, a pre-encoder is arranged after the channel encoder and the modulator in order to generate the synchronization channel. For generating the MBMS channel, a delay unit is arranged after the channel encoder and modulator.

For these channels as described above, which (in an open loop) do not require feedback information from the mobile station, MIMO transmit diversity is applied.

Figure 18:
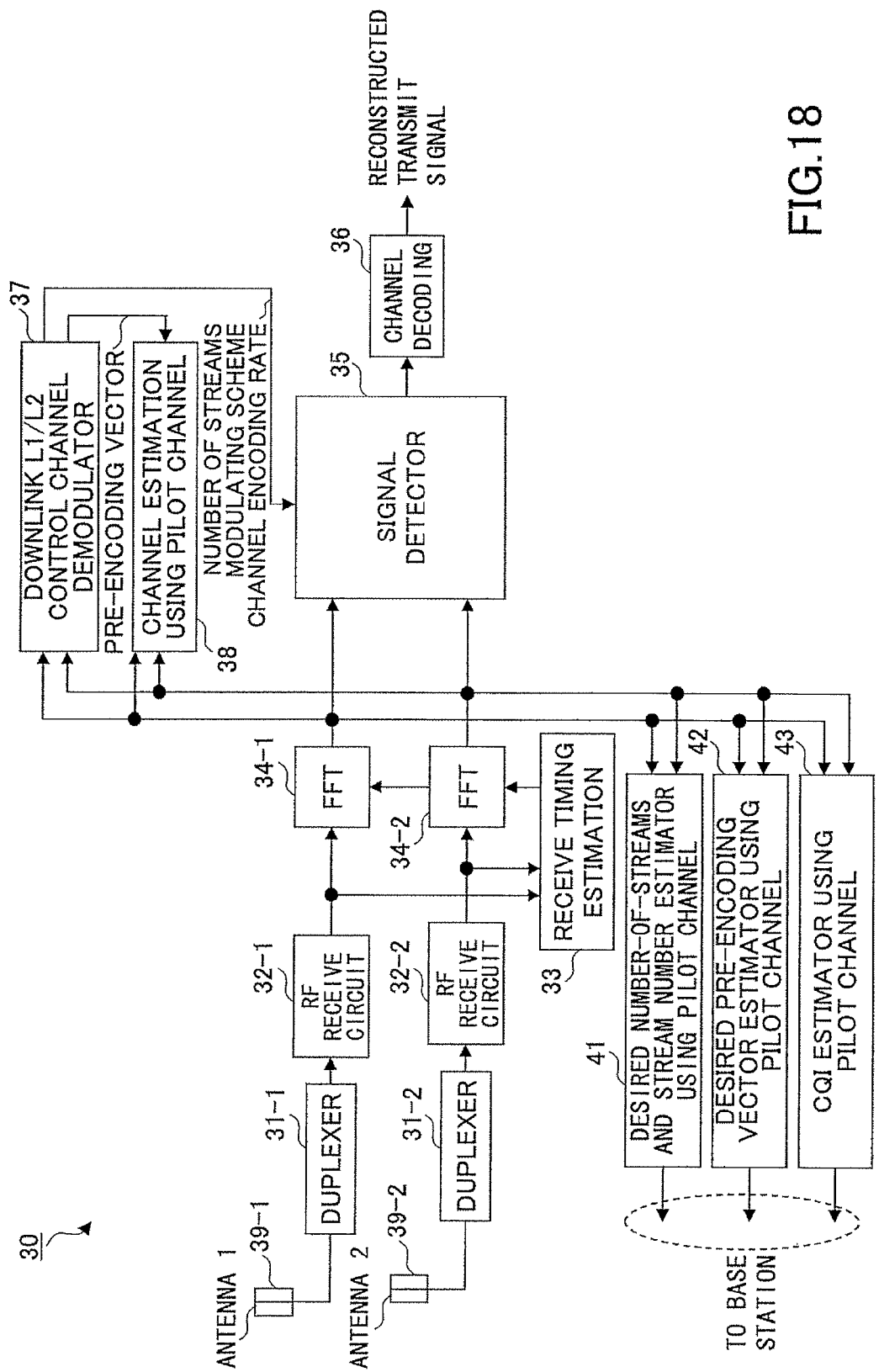
FIG. 18 is an exemplary configuration of a mobile station apparatus according to an embodiment of the present invention.

FIG. 18 is a block diagram showing a schematic configuration of a mobile station apparatus. The signals received at respective multiple antennas 39-1 and 39-2 of a mobile station apparatus 30 are each separated from a transmit signal at a duplexer 31, converted to a baseband signal at an RF receive circuit 32, and fast Fourier transformed at an FFT unit 34, where an estimated value which is estimated at the receive timing estimator 33 is input. A shared data channel is input to a signal detector 35. In the meantime, a downlink L1/L2 control channel which is incoming in association with the shared data channel is demodulated at a downlink L1/L2 control channel demodulator 37.

Of a set of information included in the control channel, the number of streams, a modulating scheme, and a channel encoding rate are input to the signal detector 35 so as to be used for demodulating the received shared data channel. In the meantime, pre-encoding vector information is input to a channel estimator 38 using a pilot channel. The shared data channel which is detected at the signal detector 35 is decoded at a channel decoder 36, reconstructing a transmit signal.

Outputs of the FFT units 34 are also input to a desired number-of-streams and stream number estimator 41 using a pilot channel, a desired pre-encoding vector estimator 42 using the pilot channel, and a CQI estimator 43 using the pilot channel. The estimated desired number of streams/stream number, desired pre-encoding vector, and CQI are reported to the base station via uplink.

As described above, according to the present embodiment, a combination of appropriate MIMO transmission control schemes and transmission channels, taking into account the kind and characteristics of physical channels to be transmitted, and the radio environment, makes it possible to improve the transmission characteristics, and achieve a more efficient radio resource utilization.

The present invention has been described by breaking it down into a number of embodiments for the convenience of explanation. However, the breakdown to each of the embodiments is not essential to the present invention, so that two or more embodiments may be used as required. While specific numerical value examples are used to facilitate understanding of the present invention, such numerical values are merely examples, so that any appropriate value may be used unless specifically indicated otherwise.

As described above, while the present invention is described with reference to specific embodiments, the respective embodiments are merely examples, so that a skilled person will understand variations, modifications, alternatives, and replacements. For convenience of explanation, while the apparatus according to the embodiments of the present invention is explained using functional block diagrams, such apparatus as described above may be implemented in hardware, software, or a combination thereof. The present invention is not limited to the above embodiments, so that variations, modifications, alternatives, and replacements are included in the present invention without departing from the spirit of the present invention.

The present application claims priority based on Japanese Patent Application No. 2006-225923 filed on Aug. 22, 2006 and Japanese Patent Application No. 2006-272344 filed on Oct. 3, 2006 with the Japanese Patent Office, the entire contents of which are hereby incorporated herein by reference.

The invention claimed is:

1. A method of controlling downlink transmission from a base station having multiple antennas to a mobile station having multiple antennas, comprising the steps of:
   applying an open loop-type Multiple Input Multiple Output (MIMO) diversity to one or more common control channels, a Multimedia Broadcast Multicast Service (MBMS) channel, and an L1/L2 control channel; and
   applying a closed loop-type MIMO multiplexing and/or MIMO diversity to a shared data channel, wherein
   the MIMO multiplexing further includes multiplying a pre-encoding vector with a transmit signal, and wherein, when transmitting the shared data channel,
   the number of streams in the MIMO multiplexing is controlled for a distributed-transmission type user, to which sub-carriers are allocated over a whole bandwidth, based on an average channel state of the whole bandwidth, wherein the pre-encoding vector for each of the streams has a fixed value.

2. The method of controlling downlink transmission as claimed in claim 1, wherein
   the MIMO multiplexing further includes multiplying a pre-encoding vector with a transmit signal, and wherein, when transmitting the shared data channel,
   a number of streams in the MIMO multiplexing and a pre-encoding vector for each of the streams are controlled for a localized-transmission type user, to which a resource block, including multiple contiguous sub-carriers, is allocated, based on a channel state of the resource block.

3. The method of controlling downlink transmission as claimed in claim 1, wherein
   the pre-encoding vector for each of the streams makes up a set of a number of fixed-value vectors, the number corresponding to the number of antennas, and wherein the number of fixed-value vectors may be switched within a stream according to a predetermined pattern.

4. The method of controlling downlink transmission as claimed in claim 2, wherein,
   for the localized-transmission type user, SINR for each of the streams in a sub-band which is a grouping of one resource block or multiple neighboring resource blocks, a stream number used, and a pre-encoding vector number for each stream are transmitted from the mobile station to the base station.

5. The method of controlling downlink transmission as claimed in claim 1, wherein,
   for the distributed transmission-type user, a SINR for each of the streams of the whole bandwidth and a stream number used are transmitted from the mobile station to the base station.

6. The method of controlling downlink transmission as claimed in claim 1, wherein
   the L1/L2 control channel is divided into two encoding blocks to encode the divided blocks, and wherein
   a first of the encoding blocks includes allocated resource block information and number-of-streams information, and wherein
   a second of the encoding blocks includes pre-encoding information used for each of the streams in the MIMO multiplexing.

7. The method of controlling downlink transmission as claimed in claim 6, wherein
   the mobile station, upon receiving the L1/L2 control channel, first decodes the first encoding block to extract the number-of-streams information, and then decodes the second encoding block based on the-number-of-streams information.

8. The method of controlling downlink transmission as claimed in claim 6, wherein
   a common pilot channel to which pre-encoding is not applied is transmitted from each of the antennas of the base station, and wherein
   for the localized-transmission type user, to which a resource block including multiple contiguous sub-carriers is allocated, a dedicated pilot channel to which pre-encoding corresponding to each stream is applied is further transmitted within the allocated resource block.

9. The method of controlling downlink transmission as claimed in claim 6, wherein, for transmitting the dedicated pilot channel, pre-encoding information is not included in the L1/L2 control channel.

10. The method of controlling downlink transmission as claimed in claim 6, wherein
    a common pilot channel, to which pre-encoding is not applied, and a pre-encoded transmit signal are transmitted from each of the antennas of the base station, and wherein
    a channel estimation value of the transmit signal is estimated from the common pilot channel based on the pre-encoding information included in the L1/L2 control channel.

11. The method of controlling downlink transmission as claimed in claim 1, wherein the open loop-type delay diversity is applied to the MBMS channel.

12. The method of controlling downlink transmission as claimed in claim 1, wherein the open loop-type MIMO diversity, which multiplies pre-encoding which varies over time in a predetermined pattern to transmit the pre-encoding, is applied to a synchronization channel out of the common control channels.

13. The method of controlling downlink transmission as claimed in claim 1, wherein
    the open loop-type MIMO diversity, which applies to, out of the common control channels, a broadcast channel and a paging channel, and the L1/L2 control channel, block-encoding diversity when transmitting with the number of the antennas of up to two, and a combination of the block-encoding diversity and a delay diversity, or a time- or frequency-switched diversity when transmitting with the number of the antennas exceeding two.

14. The method of controlling downlink transmission as claimed in claim 1, wherein
    an open loop-type delay diversity is applied to, out of the common control channels, a broadcast channel and a paging channel, and the L1/L2 control channel.

15. A base station apparatus, comprising:
    multiple antennas;
    a scheduler, which allocates, to data to be transmitted to multiple users, a radio resource based on a channel state fed back from a mobile station to schedule transmission;
    a serial/parallel converter, which converts a number of streams into the transmit data based on stream information fed back from the mobile station, the number corresponding to a number up to the number of the antennas; and a pre-encoding processor, which applies pre-encoding to each of the streams by multiplying a pre-encoding vector with a transmit signal, wherein the pre-encoded transmit data is transmitted from the multiple antennas, and wherein when transmitting a shared data channel, the number of streams is controlled, wherein the pre-encoding vector for each of the streams has a fixed value.

16. The base station as claimed in claim 15, wherein
the pre-encoding processor applies a pre-encoding vector, which is fed back from the mobile station, to each of the streams of a transmit signal to one of the users, to which a resource block including multiple contiguous sub-carriers is allocated by the scheduler.

17. The base station as claimed in claim 15,
wherein the pre-encoding processor includes a fixed pre-encoding weight setting unit, and
wherein a predetermined pre-encoding vector is applied to each of the streams of a transmit signal transmitted to one of the users, to which sub-carriers spread over a whole bandwidth are allocated as a resource block by the scheduler.

18. The base station apparatus as claimed in claim 15, further including
a signal generator, which generates one or more physical channels other than a data channel in which the transmit data is transmitted, wherein
the physical channels other than the data channel are transmitted from the multiple antennas using transmit diversity without feedback information from the mobile station.

19. The base station apparatus as claimed in claim 18, wherein
the signal generator which generates the physical channels other than the data channel generates an L1/L2 control channel in association with the data channel, and wherein the L1/L2 control channel includes a first encoding block in which information on a resource block allocated by the scheduler and the number of the streams are encoded, and a second encoding block in which information on pre-encoding applied to each of the streams is encoded.

20. The base station apparatus as claimed in claim 18, wherein the signal generator generates
common pilot channels, which are not pre-encoded, transmitted from each of the multiple antennas, and
dedicated pilot channels, which are pre-encoded, corresponding to the respective streams, within a resource block allocated to a localized-transmission type user, to which multiple contiguous sub-carriers are allocated as the resource block by the scheduler.

21. The method of controlling downlink transmission as claimed in claim 1, wherein
when transmitting the shared data channel,
for a distributed-transmission type user, to which sub-carriers are allocated over a whole bandwidth, the number of streams in the MIMO multiplexing is controlled based on an average channel state of the whole bandwidth, and wherein
an open loop-type MIMO diversity is also used when the number of the streams is less than the number of the antennas.

22. The method of controlling downlink transmission as claimed in claim 1, wherein,
when transmitting the shared data channel,
a multi-user MIMO is applied, which spatially multiplexes using multiple streams in the MIMO multiplexing.

23. The method of controlling downlink transmission as claimed in claim 1, wherein
the L1/L2 control channel is divided into two encoding blocks to encode the divided blocks, and wherein
a first of the encoding blocks includes allocated resource block information, and wherein
a second of the encoding blocks includes pre-encoding information used for each of the streams in the MIMO multiplexing.

24. A method of controlling downlink transmission as claimed in claim 23, wherein
a MIMO mode indicating one of single-user MIMO and multi-user MIMO, the-number-of-the-streams information, and information indicating whether a user is a localized-transmission type user, to which a resource block including multiple contiguous sub-carriers is allocated, or a distributed-transmission type user, to which sub-carriers are allocated over the whole bandwidth are transmitted in a high-layer signal.

25. The method of controlling downlink transmission as claimed in claim 24, wherein
the mobile station, upon receiving the L1/L2 control channel, first decodes the first encoding block, and then the second encoding block based on the number-of-the-streams information, which is reported using the high-layer signal.

26. The method of controlling downlink transmission as claimed in claim 1, wherein a time-switched diversity is applied to a synchronization channel, out of the common control channels.

27. The method of controlling downlink transmission as claimed in claim 23, wherein,
to the first encoding block and the second encoding block, a block encoding diversity is applied when transmitting with the number of the antennas of more than two, and an open loop-type diversity, which is a combination of a block-encoding diversity, and a delay diversity or a time- or frequency-switched diversity are applied when transmitting with the number of the antennas of more than two.

28. The method of controlling downlink transmission as claimed in claim 23, wherein the MIMO diversity is applied, which multiplies the pre-encoding with the second encoding block to transmit the multiplied block.

* * * * *

UNITED STATES PATENT AND TRADEMARK OFFICE
CERTIFICATE OF CORRECTION

PATENT NO. : 8,385,246 B2
APPLICATION NO. : 12/438077
DATED : February 26, 2013
INVENTOR(S) : Mamoru Sawahashi et al.

It is certified that error appears in the above-identified patent and that said Letters Patent is hereby corrected as shown below:

In the Claims:

At column 15, claim number 1, line number 20, the word "*further*" should be omitted.

At column 15, claim number 1, line number 24, the words "*for a distributed-transmission type user, to which sub-carriers are allocated over a whole bandwidth, based on an average channel state of the whole bandwidth*" should be omitted.

Signed and Sealed this
Thirteenth Day of August, 2013

Teresa Stanek Rea
*Acting Director of the United States Patent and Trademark Office*